US010891426B2

(12) United States Patent
Ohtake et al.

(10) Patent No.: US 10,891,426 B2
(45) Date of Patent: Jan. 12, 2021

(54) EDITING PROGRAM, EDITING DEVICE, AND EDITING METHOD FOR EDITING TEXT AND DISPLAYING THE EDITED TEXT

(71) Applicant: FUJITSU LIMITED, Kawasaki (JP)

(72) Inventors: Tomohiro Ohtake, Kawasaki (JP); Yohei Seki, Kawasaki (JP); Toshihiro Kodaka, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 102 days.

(21) Appl. No.: 16/166,280

(22) Filed: Oct. 22, 2018

(65) Prior Publication Data
US 2019/0121844 A1 Apr. 25, 2019

(30) Foreign Application Priority Data

Oct. 23, 2017 (JP) ................. 2017-204218

(51) Int. Cl.
G06F 40/166 (2020.01)
G06F 40/106 (2020.01)
(52) U.S. Cl.
CPC .......... G06F 40/166 (2020.01); G06F 40/106 (2020.01)
(58) Field of Classification Search
CPC .................................................. G06F 40/166
See application file for complete search history.

(56) References Cited

U.S. PATENT DOCUMENTS 10,248,933 B2* 4/2019 Pai ....................... G06Q 10/101
2009/0276771 A1* 11/2009 Nickolov ............. G06F 9/4856
717/177

(Continued)

FOREIGN PATENT DOCUMENTS

JP H05-108518 4/1993
JP 2010-140076 6/2010
JP 2014-530437 11/2014

OTHER PUBLICATIONS

Altadmri et al., "The Cost of Syntax and How to Avoid It: Text versus Frame-Based Editing," 2016 IEEE 40th Annual Computer Software and Applications Conference (COMPSAC), p. 748-753. (Year: 2016).*

(Continued)

Primary Examiner — Amelia L Tapp
(74) Attorney, Agent, or Firm — Fujitsu Patent Center

(57) ABSTRACT

A non-transitory computer-readable storage medium storing therein an editing program for causing a computer to execute a process comprising: when a command has been input in the text of the editing data, starting an application program, and displaying an application image generated by the application program together with the editor image on the preview screen; when a user operation for changing the application image is performed, receiving first application data changed by the application program together with the application image, and insertion position information; inserting the first application data to the insertion position represented by the insertion position information in the text; and when the application data inserted in the editing data have been changed, causing the application program to overwrite changed second application data on the first application data, and transmitting a message to change the application image together with the second application data to the application program.

7 Claims, 27 Drawing Sheets

(56) References Cited

U.S. PATENT DOCUMENTS

| | | | | |
|---|---|---|---|---|
| 2014/0248857 | A1* | 9/2014 | Huang | H04N 21/8543 455/412.1 |
| 2015/0288775 | A1* | 10/2015 | Larabie-Belanger | H04L 51/043 715/203 |
| 2017/0337234 | A1* | 11/2017 | Goldman | G06F 16/235 |
| 2017/0344257 | A1* | 11/2017 | Gnedin | H04L 67/20 |
| 2018/0088764 | A1* | 3/2018 | Lu | H04M 1/72522 |

OTHER PUBLICATIONS

Hempel et al., "Deuce: A Lightweight User Interface for Structured Editing," 2018 ACM/IEEE 40th International Conference on Software Engineering, p. 654-664. (Year: 2018).*

* cited by examiner

FIG. 13

POSITION INFORMATION TABLE 243

| ID | INSERTION POSITION |
|----|--------------------|
| 1  | (2,0)-(2,0)        |
| 2  | (7,0)-(7,0)        |

FIG. 16

POSITION INFORMATION TABLE 243

| ID | POSITION |
|---|---|
| 1 | (2,1)-(8,2) |
| 2 | (14,1)-(14,1) |

FIG. 17

APPLICATION CORRESPONDENCE TABLE 244

| info string | APPLICATION PROGRAM |
|---|---|
| 'kpt' | CONSTRUCTOR FUNCTION OF kpt APPLICATION |
| 'map' | CONSTRUCTOR FUNCTION OF map APPLICATION |

FIG. 20

| ID | POSITION |
|----|----------|
| 1  | (6,0)-(6,0) |

POSITION INFORMATION TABLE 243

FIG. 23

| ID | POSITION |
|---|---|
| 1 | (8,0)-(8,0) |

POSITION INFORMATION TABLE 243

EDITING PROGRAM, EDITING DEVICE, AND EDITING METHOD FOR EDITING TEXT AND DISPLAYING THE EDITED TEXT

CROSS-REFERENCE TO RELATED APPLICATION

This application is based upon and claims the benefit of priority of the prior Japanese Patent Application No. 2017-204218, filed on Oct. 23, 2017, the entire contents of which are incorporated herein by reference.

FIELD

The present invention relates to an editing program, an editing device, and an editing method.

BACKGROUND

An editing system has been known that, when a text described in a markup language such as a Markdown format is input, interprets the input text and displays a predetermined image on a preview screen. Japanese Patent Application Publication No. 2010-140076 and Published Japanese Translation of PCT International Application No. 2014-530437 relate to the preview screen.

SUMMARY

However, a problem associated with the abovementioned editing system is that when a user edits a text by inputting the text (character string) via an input device, although the predetermined image can be changed, when a user operation for changing the predetermined image is performed on the preview screen, this change is not reflected in the text, that is, the text can be edited only from one direction.

One embodiment is a non-transitory computer-readable storage medium storing therein an editing program for causing a computer to execute a process comprising:

when editing data having a text have been changed, displaying a text of the changed editing data on an editor screen, and displaying an editor image generated based on the changed editing data on a preview screen;

when a command to start an application program has been input in the text of the editing data, starting the application program, and displaying an application image generated by the application program together with the editor image on the preview screen;

when a user operation for changing the application image is performed, receiving first application data changed by the application program together with the application image, and insertion position information on the first application data in the text of the editing data;

inserting the first application data to the insertion position represented by the insertion position information in the text of the editing data in response to the reception; and when the application data inserted in the editing data have been changed, causing the application program to overwrite changed second application data on the first application data, and transmitting a message to change the application image on the basis of the first application data together with the second application data to the application program.

According to the one embodiment, there are provided an editing program, an editing device, and an editing method that make it possible to edit the editing data (text) by inputting the text and to edit the editing data (text) even when the user operation for changing the predetermined image is performed, that is, to edit the text from both directions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart for explaining the outline of the process of an Editor program 232a.

FIG. 13 is an example of the position information table 243.

FIG. 16 illustrates another example of the position information table 243.

FIG. 17 illustrates an example of the application correspondence table 244.

FIG. 20 illustrates another example of the position information table 243.

FIG. 23 illustrates another example of the position information table 243.

DESCRIPTION OF EMBODIMENTS

Outline of First Embodiment

Figure 1:
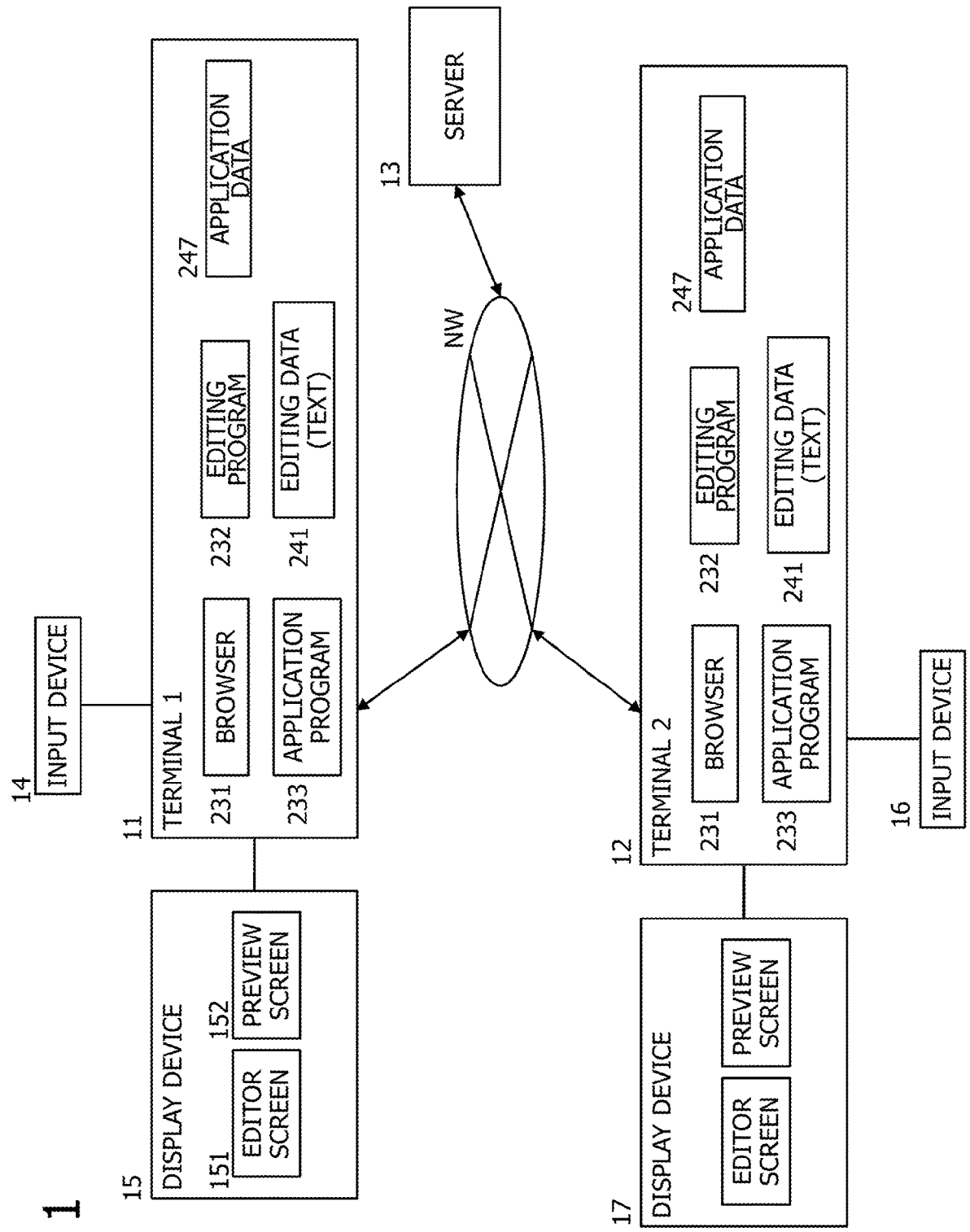
FIG. 1 is a diagram representing a schematic configuration of an editing system for editing the editing data having a text.

FIG. 1 is a diagram representing a schematic configuration of an editing system for editing the editing data having a text. As depicted in FIG. 1, the editing system includes a plurality of terminals 11, 12 by which the user edits the text of editing data, and a server 13 for transferring the text (or a difference before and after editing) input from a certain terminal to another terminal. The terminals 11, 12 are examples of editing devices. The terminals 11, 12 and the server 13 can communicate with each other via a network NW such as the Internet.

The configuration, operation and the like of the server 13 will be described in the second embodiment. In the first embodiment, the configuration and operation of the terminals 11, 12 will be described. Since the terminals 11, 12 have the same configuration, the configuration and operation of the terminal 11 will be mainly described below by way of example.

The terminal 11 is a computer and has a main memory and a processor. Further, the processor of the terminal 11 executes a browser 231 and also executes an editing program (editor) 232 and an application program 233 on the browser 231 to display the edited text on an editor screen 151 in a display device 15 and to display an editor image based on the edited text and an application image generated by the application program 233 on a preview screen 152 in the display device 15.

Figure 2:
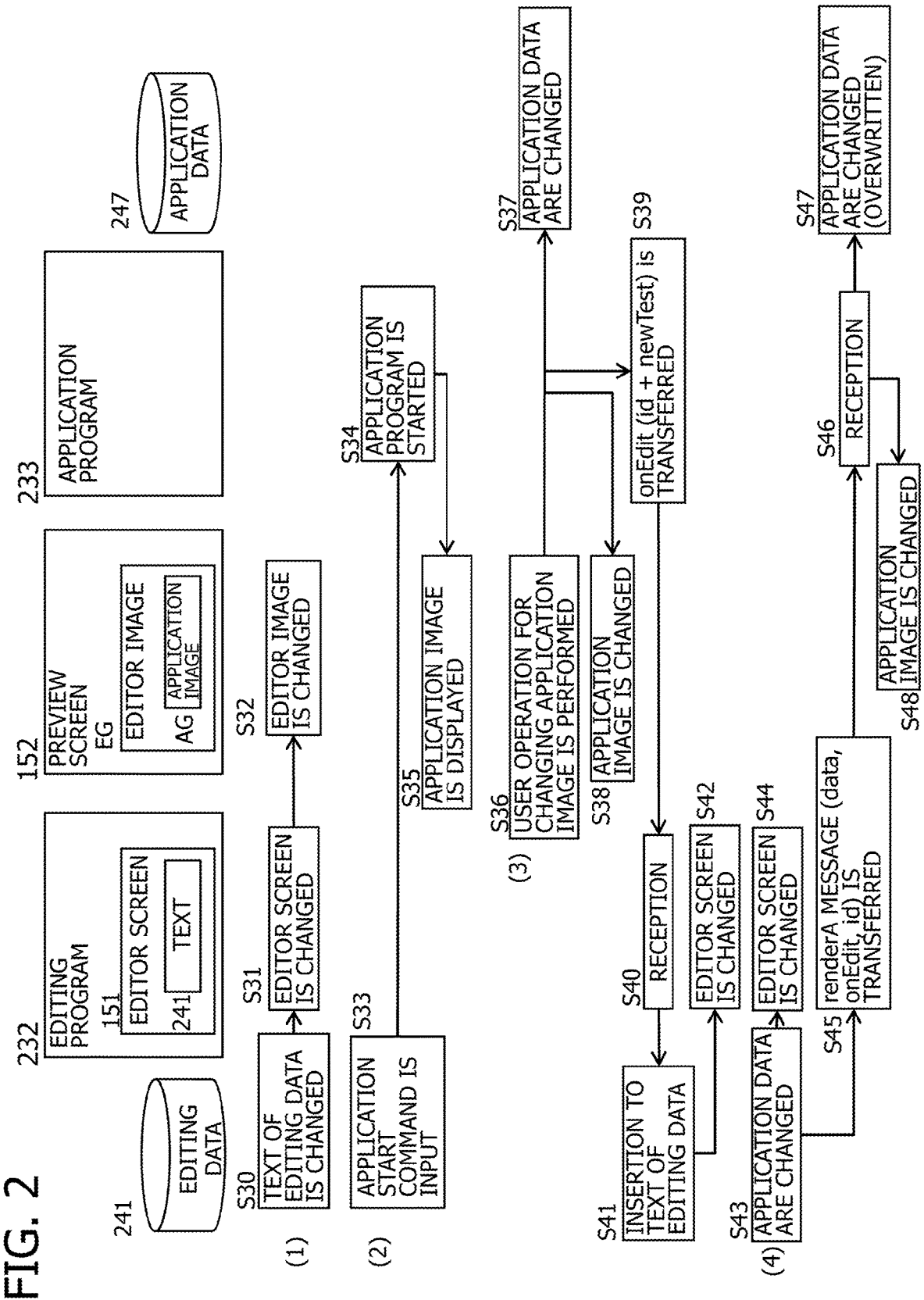
FIG. 2 is a diagram representing an outline of the process of the editing program 232 and the application program 233.

FIG. 2 is a diagram representing an outline of the process of the editing program 232 and the application program 233.

The processor of the terminal 11 performs the following first to fourth processes by executing the browser 231 and also the editing program 232 and the application program 233 on the browser 231.

(1) In the first process, the user edits the text of the editing data (hereinafter simply referred to as text) via an input device 14 (for example, a keyboard), and when the text is changed (S30), the processor of the terminal 11 executes the editing program 232 to change the text 241 on the editor screen 151 (S31) and change the editor image EG on the preview screen 152 (S32).

The text is described in a Markdown format (notation). The text may be also described in other markup languages. The editor image EG, as referred to herein, is an image displayed on the preview screen 152 as a result of the processor of the terminal 11 executing the editing program 232 and interpreting the text (text other than the text surrounded by a fenced code block) described in the Markdown format (notation) or other markup language.

The process (S31) of changing the text 241 on the editor screen 151 is, for example, a process of displaying the text 241 after the change instead of the text 241 before the change on the editor screen 151. The process (S32) of changing the editor image EG is, for example, a process of displaying the editor image EG generated on the basis of the text after the change instead of the editor image EG generated on the basis of the text before the change on the preview screen 152.

(2) In the second process, when the user inputs an application start command in the text via the input device 14 (S33), the processor of the terminal 11 executes the editing program 232 and starts the application program 233 corresponding to the application start command (S34). As a result, the processor of the terminal 11 displays an application image AG generated by the application program 233 (an instance generated by the application program 233; hereinafter, the instance is sometimes called the application program 233) together with the editor image EG on the preview screen 152 (S35).

(3) In the third process, when the user operation for changing the application image AG is performed with respect to the application program 233 on the preview screen 152 (S36), the processor of the terminal 11 executes the application program 233 to change application data 247 (S37) and also changes the application image AG on the basis of the changed application data 247 (S38).

The process of changing the application data 247 (S37) is, for example, a process in which, when the user operation for changing the application image AG is performed (S36), the processor of the terminal 11 changes (overwrites) the application data 247 which are stored in a storage by the application data generated by executing the application program 233. The process of changing the application image AG (S38) is, for example, a process of displaying the application image AG to which a character string, an image or the like generated based on the changed application data 247 has been added, instead of the application image AG before the change, on the preview screen 152.

The application data is a text generated by the application program 233 when the user operation for changing the application image AG is performed. The application data may be input by the user to the text 241 via the input device 14 or may be received from the server 13. The case where the application data are received from the server 13 will be described in the second embodiment.

The application program 233, for example, interprets the changed application data 247 stored in the storage, and changes and displays the application image AG.

Further, in the third process, the processor of the terminal 11 executes the application program 233 to transfer (transmit) a variable id to which insertion position information representing the position, to which the application data 247 changed in S37 is to be inserted, has been substituted and a variable newText to which the application data 247 changed in S37 has been substituted to the editing program 232 (S39). The variable id and the variable newText are transferred, for example, by the processor of the terminal 11 executing the application program 233 and executing the onEdit function which is a callback function using these as arguments.

Further, in the third process, the processor 20 of the terminal 11 executes the editing program 232 and receives the variable id and the variable newText (S40). Then, the processor of the terminal 11 executes the editing program 232, and in response to the reception, inserts the application data 247 (first application data) substituted to the variable newText to a position indicated by the insertion position information substituted to the variable id in the text 241 (S41) and also changes the text 241 on the editor screen 151 (S42). The process of changing the text 241 on the editor screen 151 (S42) is, for example, a process of displaying the changed text 241 (here the text 241 to which the application data 247 substituted in the variable newText have been inserted) instead of the text 241 before the change on the editor screen 151.

(4) In the fourth process, in the case where the application data 247 inserted to the text 241 have been changed (S43), the processor of the terminal 11 executes the editing program 232 to change the text 241 on the editor screen 151 (S44).

The case where the application data 247 inserted to the text 241 have been changed is, for example, a case in which the application data input by the user via the input device 14 have been inserted to the text 241 or a case in which the application data received from the server 13 have been inserted to the text 241.

The process (S44) of changing the text 241 on the editor screen 151 is, for example, a process of displaying the changed text 241 (here, the text 241 to which the application data 247 changed in S43 have been inserted) instead of the text 241 before the change on the editor screen 151.

At the same time, the processor 20 of the terminal 11 executes the editing program 232 to transfer a renderA message, the variable data to which the application data 247 changed in S43 have been substituted, the onEdit function which is a call back function, and a variable id to which the insertion position information representing the position for inserting the application data has been substituted to the application program 233 (S45).

In the fourth process, the processor of the terminal 11 executes the application program 233, and when receiving the renderA message, variable data, onEdit function, and variable id (S46), performs the processing (S47) of changing (overwriting) the application data 247 (first application data) stored in the storage with the application data (second application data) substituted to the variable data and also changes the application image AG displayed on the preview screen 152 on the basis of the changed application data 247 (S48). The process of changing the application image AG (S48) is, for example, a process of displaying the application image AG, to which a character string, an image or the like generated based on the changed application data 247 has been added, instead of the application image AG before the change on the preview screen 152.

Details of the First Embodiment

First, when the user edits (changes) the editing text 241 with the editing program 232, this is reflected in the editor image EG on the preview screen 152.

Meanwhile, when the user performs an application input with respect to the application image AG on the preview screen 152, this is reflected in the application image AG, and the changed application data are inserted to the editing text 241. Therefore, by sharing the editing text 241 among the plurality of terminals 11, 12 via the server 13, it is possible to share and edit a composite image of the editing program 232 and the application program 233 on the web.

Figure 3:
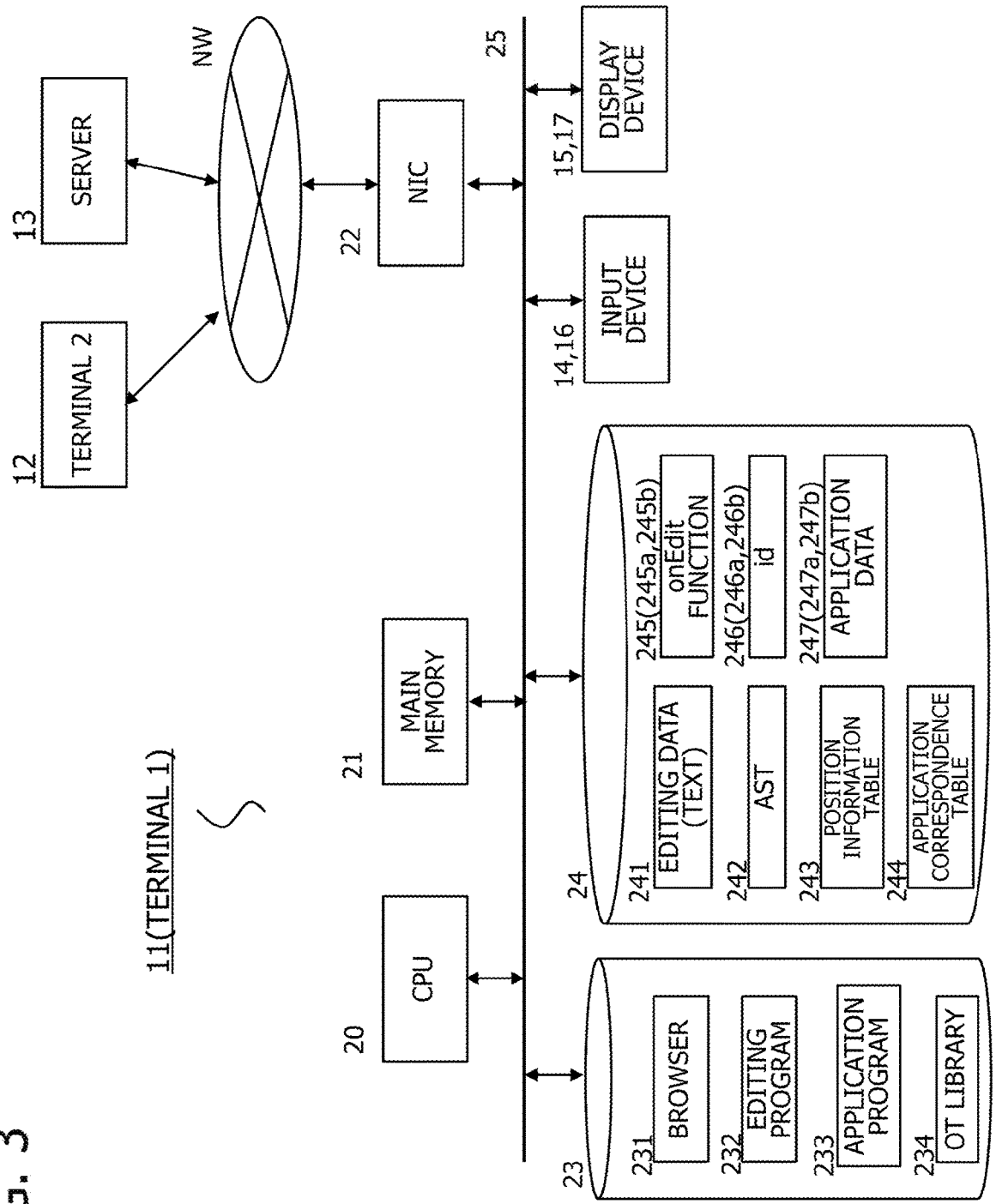
FIG. 3 is a diagram representing a configuration example of the terminal 11.

FIG. 3 is a diagram representing a configuration example of the terminal 11. The terminal 11 includes a CPU 20 (hereinafter also referred to as a processor 20), a main memory 21, an NIC 22 (network interface card), storages 23, 24 as auxiliary storage devices, a bus 25, input devices 14, 16 (for example, a keyboard, a mouse), and display devices 15, 17 (for example, liquid crystal displays). An OS (not depicted in the drawing), the browser 231, the editing program 232, the application program 233, and an operational transformation (OT) library 234 are stored in the storage 23. These programs are developed in the main memory 21 and are executed by the CPU 20. An example of using the OT library 234 will be described in the second embodiment.

Further, the storage 24 stores the editing data 241 having a text, an abstract syntax tree (AST) 242, a position information table 243, an application correspondence table 244, an onEdit function 245, an id 246, and the application data 247. The AST is also called abstract syntax tree. The storage 24 may be the main memory 21. The editing program 232, the application program 233, and the OT library 234 are written in, for example, JavaScript (registered trademark), and are downloaded from the server 13 or the like and stored in the storage 23 by the terminal 11 executing the browser 231.

Figure 4:
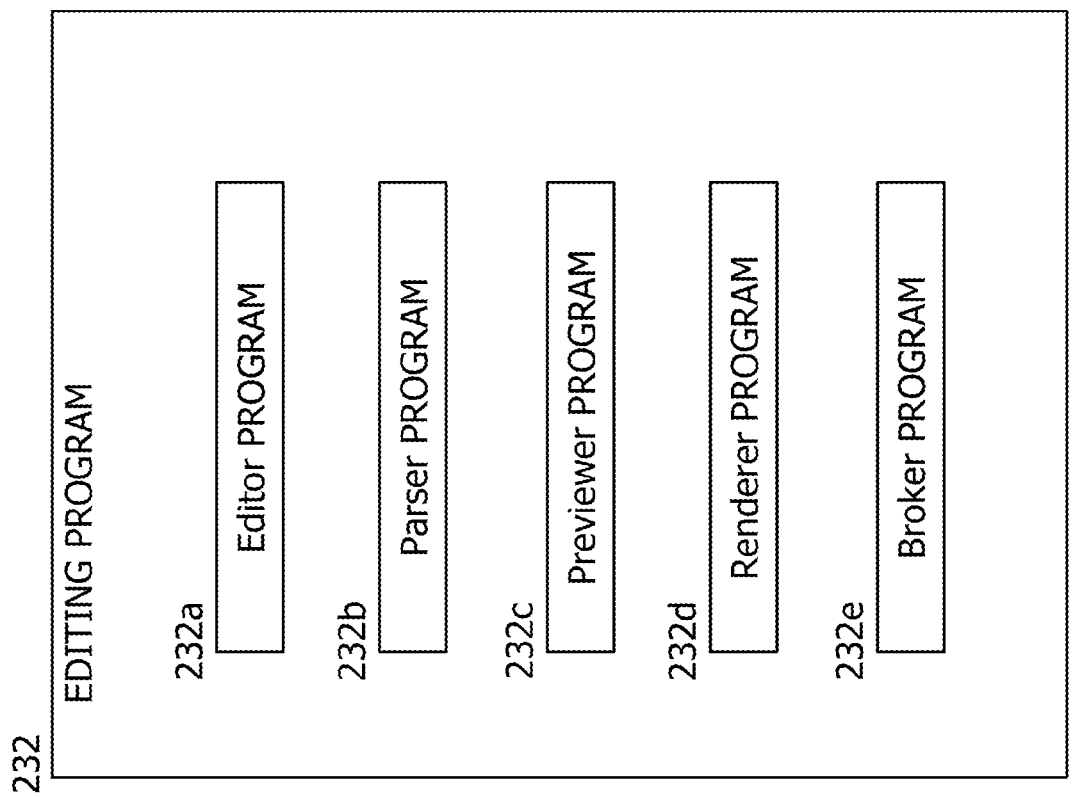
FIG. 4 is a diagram representing a group of programs constituting the editing program 232.

FIG. 4 is a diagram representing a group of programs constituting the editing program 232. As depicted in FIG. 4, the editing program 232 includes an Editor program 232a, a Parser program 232b, a Previewer program 232c, a Renderer program 232d, and a Broker program 232e. These programs are written in, for example, a JavaScript. These programs are sometimes called components.

Outline of Process of Editor Program 232a

The processor 20 of the terminal 11 executes the Editor program 232a to display the editor screen 151 on the display device 15. When the user edits the text via the input device 14, the processor 20 executes the Editor program 232a to change the editor screen 151.

Figure 5:
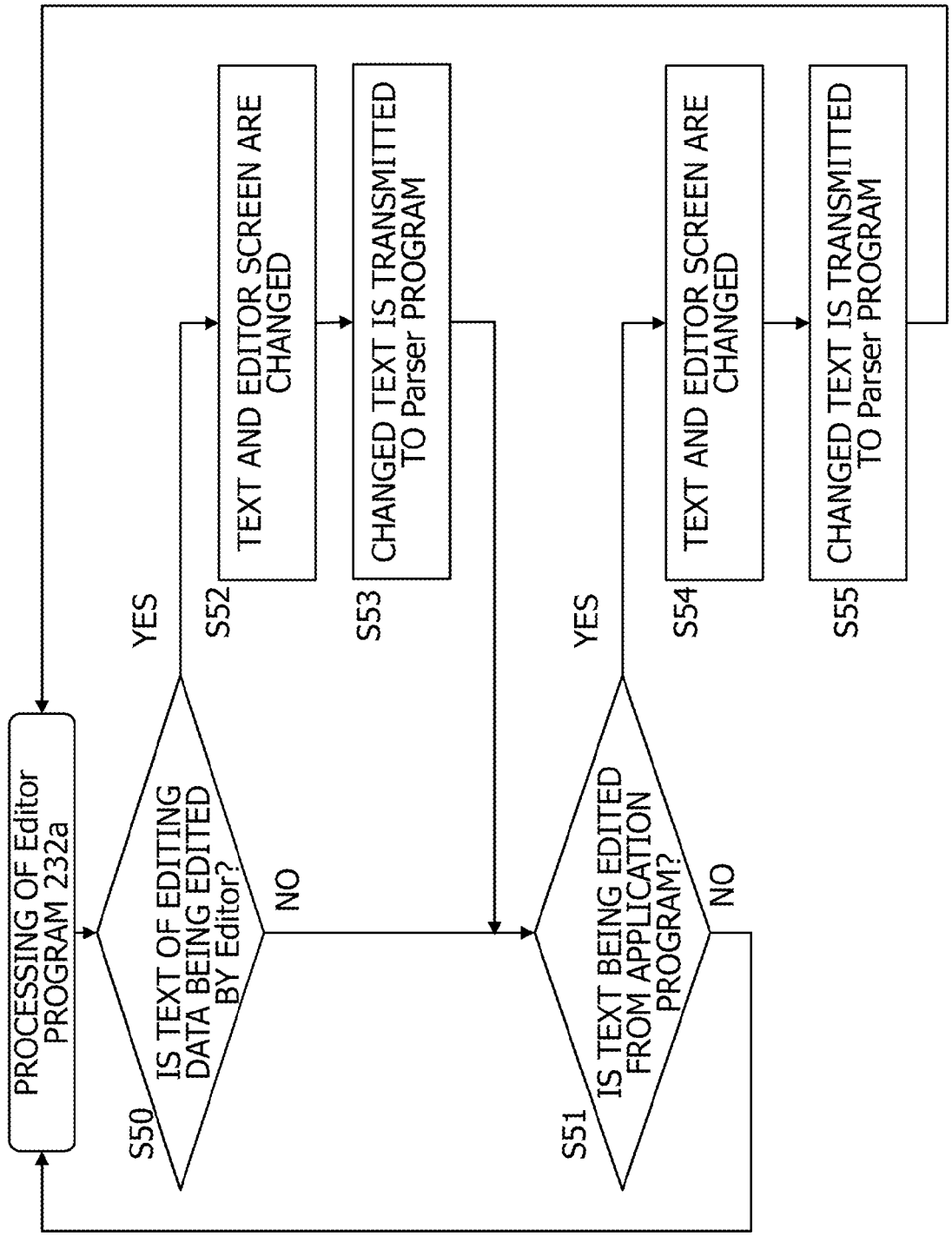

FIG. 5 is a flowchart for explaining the outline of the process of an Editor program 232a. The processor 20 of the terminal 11 executes the Editor program 232a to determine whether or not the user has edited the text via the input device 14 (S50) and to determine whether or not the text has been edited from the application program 233 (S51). As a result, where it is determined that editing has not been performed (S50: NO, S51: NO), the processing of S50 and S51 is repeatedly executed.

Meanwhile, where it is determined in S50 that the user has edited the text via the input device 14 (S50: YES), the processor 20 of the terminal 11 executes the Editor program 232a to change the text 241 displayed on the editor screen 151 and the editor image EG displayed on the preview screen 152 (S52) and to transmit the changed text to the Parser program 232b (S51).

Where it is determined in S51 that the text has been edited from the application program 233 (S51: YES), the processor 20 of the terminal 11 executes the Editor program 232a to change the text 241 displayed on the editor screen 151 and the editor image EG displayed on the preview screen 152 (S54) and to transmit the changed text to the Parser program 232b (S55).

Outline of Process of Parser Program 232b

The processor 20 of the terminal 11 executes the Parser program 232b, and when receiving the text (character string described by Markdown) transmitted by the Editor program 232a, generates an AST by executing well-known text analysis.

Further, the processor 20 of the terminal executes the Parser program 232b to generate an insertion position (insertion position information), which represents a position (insertion position with respect to the text) for inserting the application data to be transmitted by the application program 233, and to store the generated insertion position in the position information table 243.

The processor 20 of the terminal also executes the Parser program 232b to transmit the AST to the Previewer program 232c.

Outline of Process of Previewer Program 232c

The processor 20 of the terminal 11 executes the Previewer program 232c to display the preview screen 152 on the display device 15.

Further, the processor 20 of the terminal executes the Previewer program 232*c*, and when receiving the AST transmitted by the Parser program 232*b*, transmits a renderC message for displaying an application image and a renderP message for displaying an editor image.

Outline of Process of Renderer Program 232*d*

The processor 20 of the terminal 11 executes the Renderer program 232*d*, and when receiving a renderP message transmitted by the Previewer program 232*c*, generates an editor image and displays the generated editor image on the preview screen 152.

Outline of Process of Broker Program 232*e*

The processor 20 of the terminal 11 executes the Broker program 232*e*, and when receiving the renderC message transmitted by the Previewer program 232*c*, starts the application program 233 to generate an instance of the application program 233 and transmits a renderA message for displaying the application image with respect to the generated instance.

Figure 6:
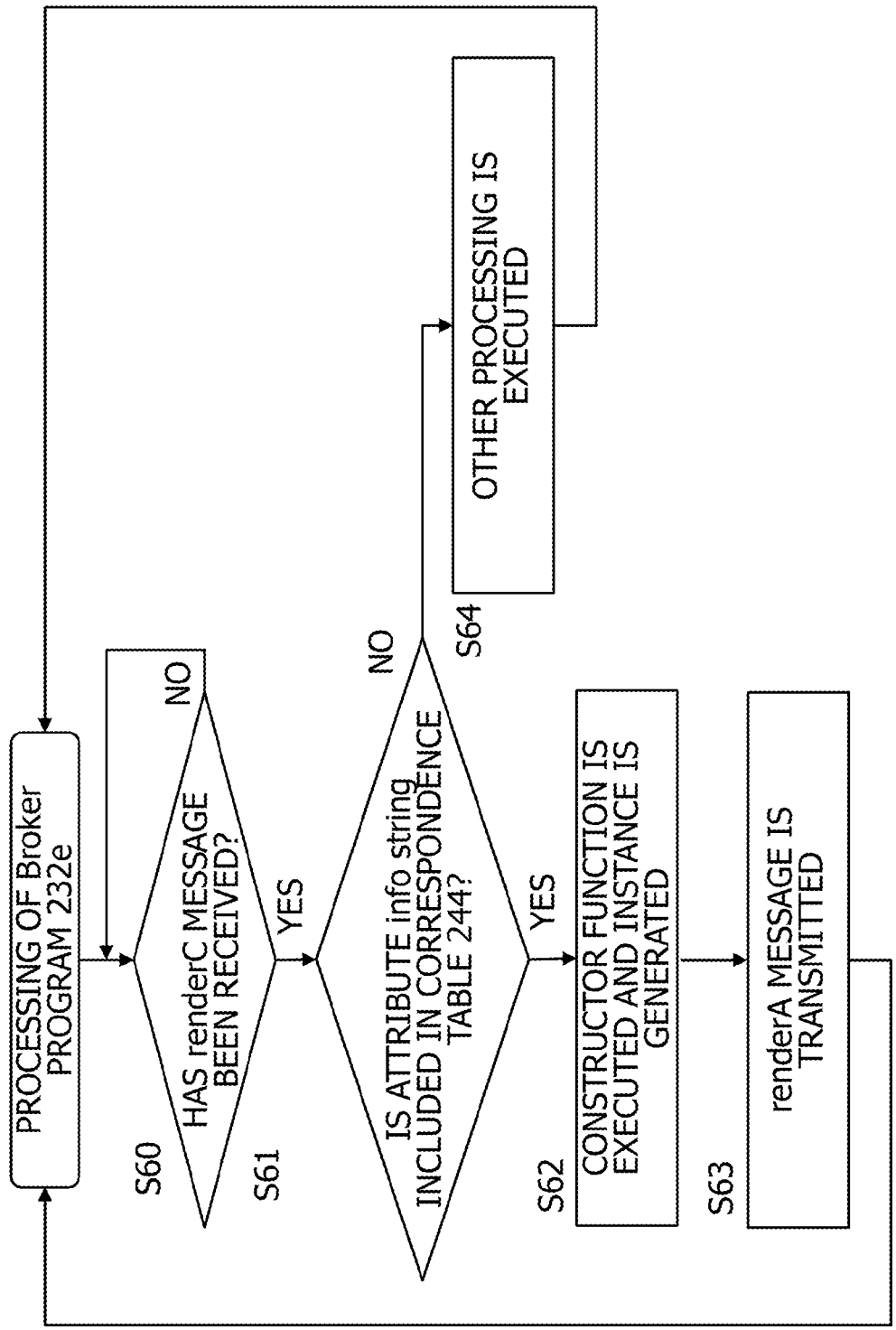
FIG. 6 is a flowchart for explaining the outline of the process of the Broker program 232e.

FIG. 6 is a flowchart for explaining the outline of the process of the Broker program 232*e*. The processor 20 of the terminal 11 executes the Broker program 232*e* to determine whether or not the renderC message transmitted by the Previewer program 232*c* has been received (S60). As a result, where it is determined that the renderC message has been received (S60: YES), the processor 20 of the terminal 11 executes the Broker program 232*e* to determine whether or not an attribute info string (described hereinbelow) received together with the renderC message is included in the application correspondence table 244 (S61). As a result, where it is determined that the attribute info string is included (S61: YES), the processor 20 of the terminal 11 executes the Broker program 232*e* to examine a constructor function with which the attribute info string has been associated by referring to the application correspondence table 244 and executes the constructor function to generate an instance of the application program 233 (S62). The generated instance is stored in the storage 24 or the main memory 21.

Next, the processor 20 of the terminal 11 executes the Broker program 232*e* to transmit the renderA message to the instance generated in S62 (S63).

Meanwhile, when it is determined in S61 that the attribute info string received together with the renderC message is not included in the application correspondence table 244 (S61: NO), the processor 20 of the terminal 11 executes the Broker program 232*e* to execute another process (for example, a process of changing the color of the text according to the syntax of the JavaScript) (S64).

Figure 7:
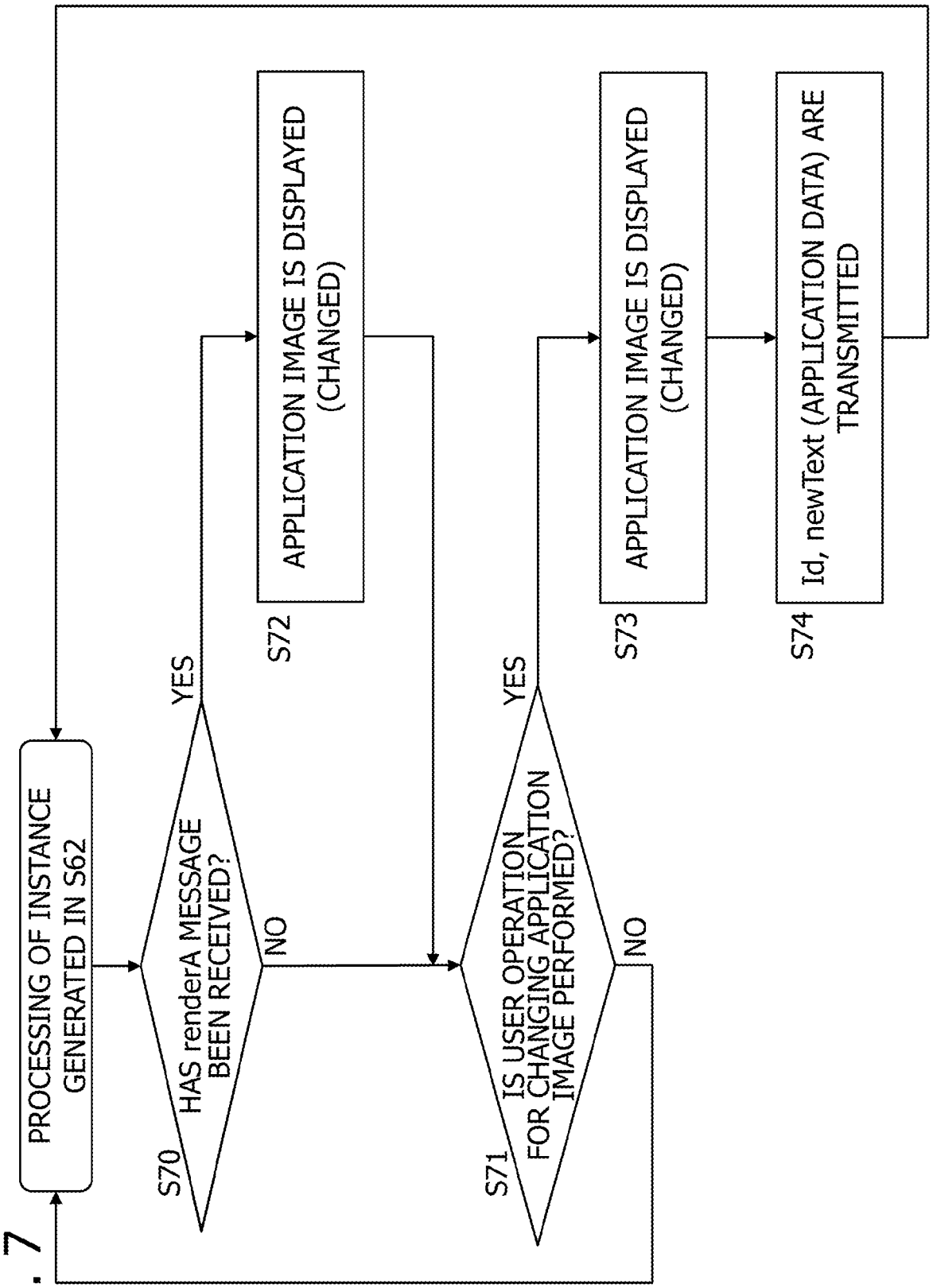
FIG. 7 is a flowchart for explaining the outline of the process of the instance generated in S62.

FIG. 7 is a flowchart for explaining the outline of the process of the instance generated in S62. The processor 20 of the terminal 11 executes the instance generated in S62 to determine whether or not the renderA message transmitted by the Broker program 232*e* has been received (S70) and determines whether or not there is the user operation for changing the application image (S71). As a result, where it is determined that no renderA message has been received (S70: NO) and no user operation has been performed (S71: NO), the processing of S70 and S71 is repeatedly executed.

Meanwhile, where it is determined in S70 that the renderA message has been received (S70: YES), the processor 20 of the terminal 11 executes the instance generated in S62 to display the application image on the preview screen (S72).

When it is determined in S71 that there is the user operation for changing the application image (S71: YES), the processor 20 of the terminal 11 executes the instance generated in S62 to display the application image on the preview screen 152 (S73). Then, the processor 20 of the terminal executes the instance generated in S62 to transmit the variable id, to which the insertion position information representing the position to which the application data 247 changed in S37 is to be inserted has been substituted, and the variable newText, to which the application data 247 changed in S37 has been substituted to the Parser program 232*b* (S74).

Detailed Processing of Editing Program 232 and Application Program 233

Figure 8:
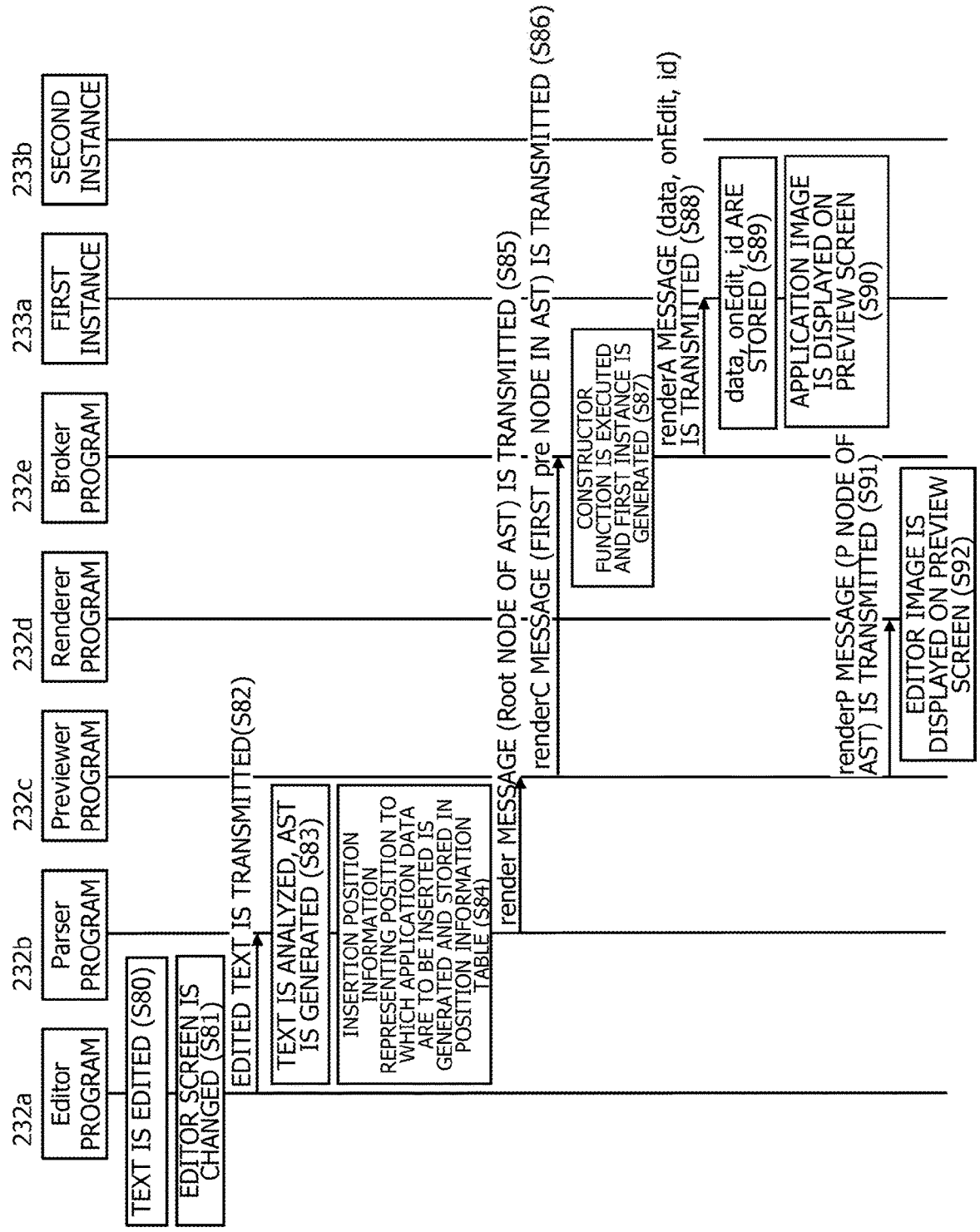
FIG. 8 is a sequence diagrams representing the detailed processing of the editing program 232 and the application program 233.
Figure 9:
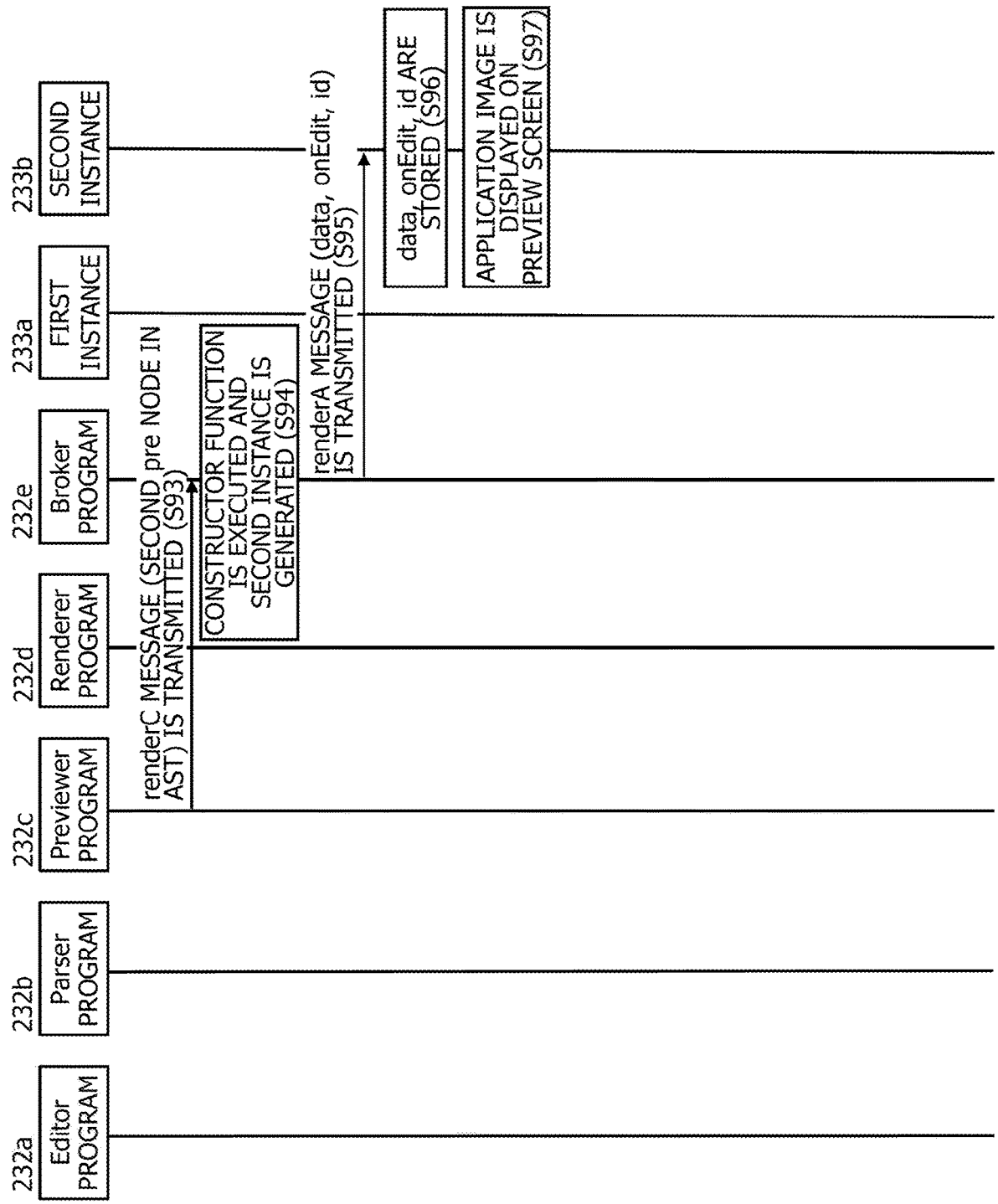
FIG. 9 is a sequence diagrams representing the detailed processing of the editing program 232 and the application program 233.
Figure 10:
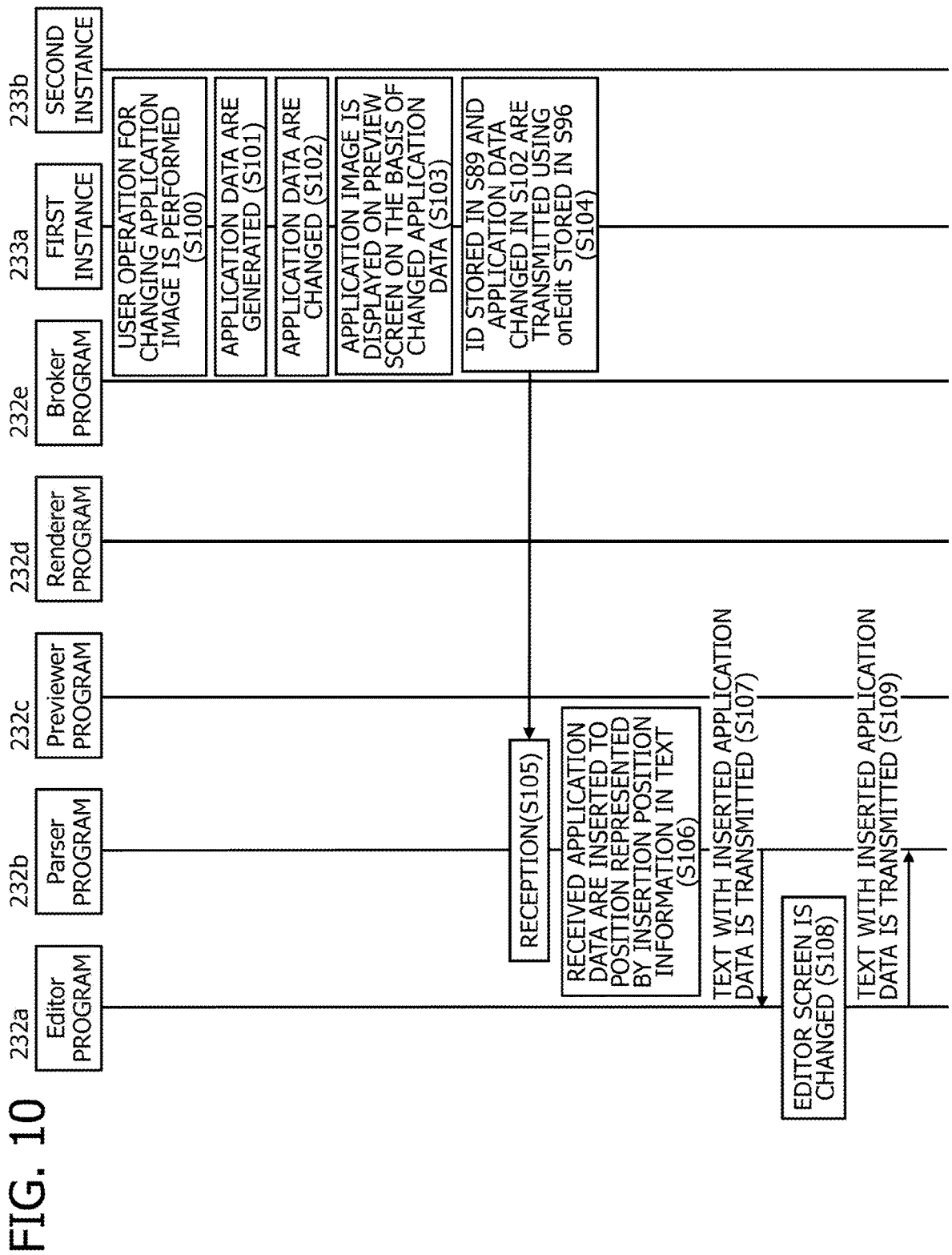
FIG. 10 is a sequence diagrams representing the detailed processing of the editing program 232 and the application program 233.

FIGS. 8 to 10 are sequence diagrams representing the detailed processing of the editing program 232 and the application program 233.

In the following description, it is assumed that the processor 20 of the terminal 11 executes each program constituting the editing program 232, that is, the Editor program 232*a*, the Parser program 232*b*, the Previewer program 232*c*, the Renderer program 232*d*, and the Broker program 232*e*.

Further, in the following description, it is assumed that the application program 233 is a kpt application program which creates a table of Keep-Problem-Try (KPT) as an application image and displays the table on the preview screen 152.

As shown in FIG. 8, first, when the user edits the text (changes the text 241 stored in the storage 24, or inputs new text, or the like) via the input device 14 (S80), the processor 20 of the terminal 11 executes the Editor program 232*a* to change the editor screen 151 (S81). More specifically, when the user edits the text via the input device 14, the processor 20 of the terminal stores the changed (edited) text 241 in the storage 24 and displays the changed text 241 instead of the text 241 before the change on the editor screen 151.

Figure 11:
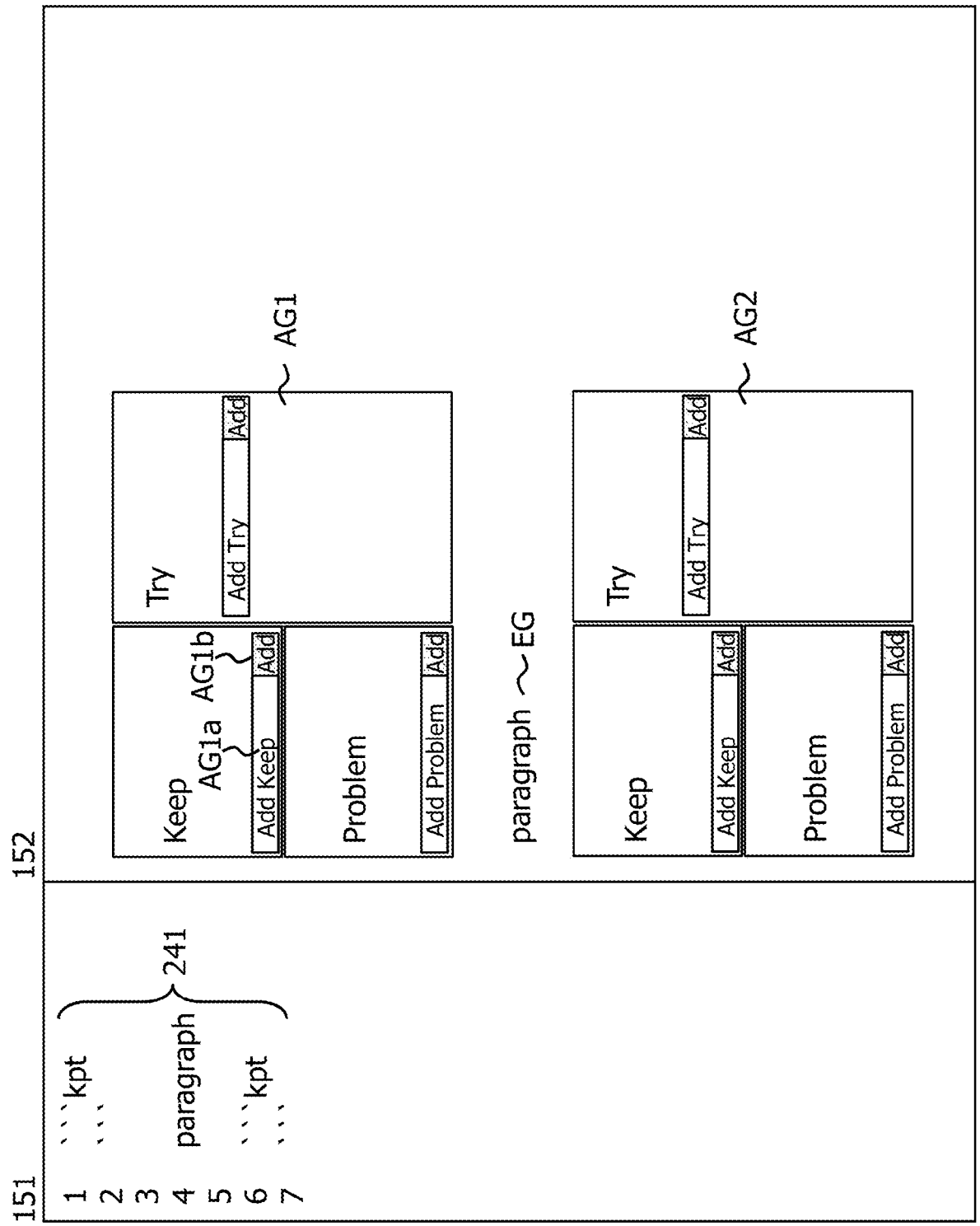
FIG. 11 represents an example of the editor screen 151 and the preview screen 152.

FIG. 11 represents an example of the editor screen 151 and the preview screen 152. FIG. 11 illustrates an example in which the changed text 241 is displayed on the editor screen 151. The number strings 1 to 7 depicted on the editor screen 151 presented in FIG. 11 represent the rows of the edited text 241.

The text 241 is described in the Markdown format (notation). The text 241 may be described in other markup languages.

In the text 241 presented in FIG. 11, three backquote characters "```" (specific character string) are called a fenced code block in the Markdown format. A specific character string is not limited to "```" and may be another character string. Text surrounded by the initial "```" (for example, the first line) and the very last "```" (for example, the second line) is regarded as the source code. In the example of the text 241 presented in FIG. 11, the text enclosed by the initial "```" (for example, the first line) and the last "```" (for example, the second line) is the initial empty character string of the second line.

Immediately after the initial "```" (for example, the first line, the sixth line) in the text 241, the application program name "kpt" is described as an info string prescribed in the Markdown specifications.

As will be described later, the kpt application program corresponding to "kpt" is started and the application image AG1 is displayed on the preview screen 152 on the basis of the first and second lines of the text 241, the editor image EG is displayed on the preview screen 152 on the basis of the fourth line, and the kpt application program corresponding to "kpt" is started and the application image AG2 is displayed on the preview screen 152 on the basis of the sixth and seventh lines.

Next, the processor 20 of the terminal 11 reads the text 241 from the storage 24 at a predetermined timing (for example, each time one character of the text is input) and transmits the text to the Parser program 232b (S82).

Next, the processor 20 of the terminal 11 executes the Parser program 232b, and when receiving the text 241, temporarily stores the text 241 in the storage 24 and generates an AST by executing well-known text analysis (S83).

Figure 12:
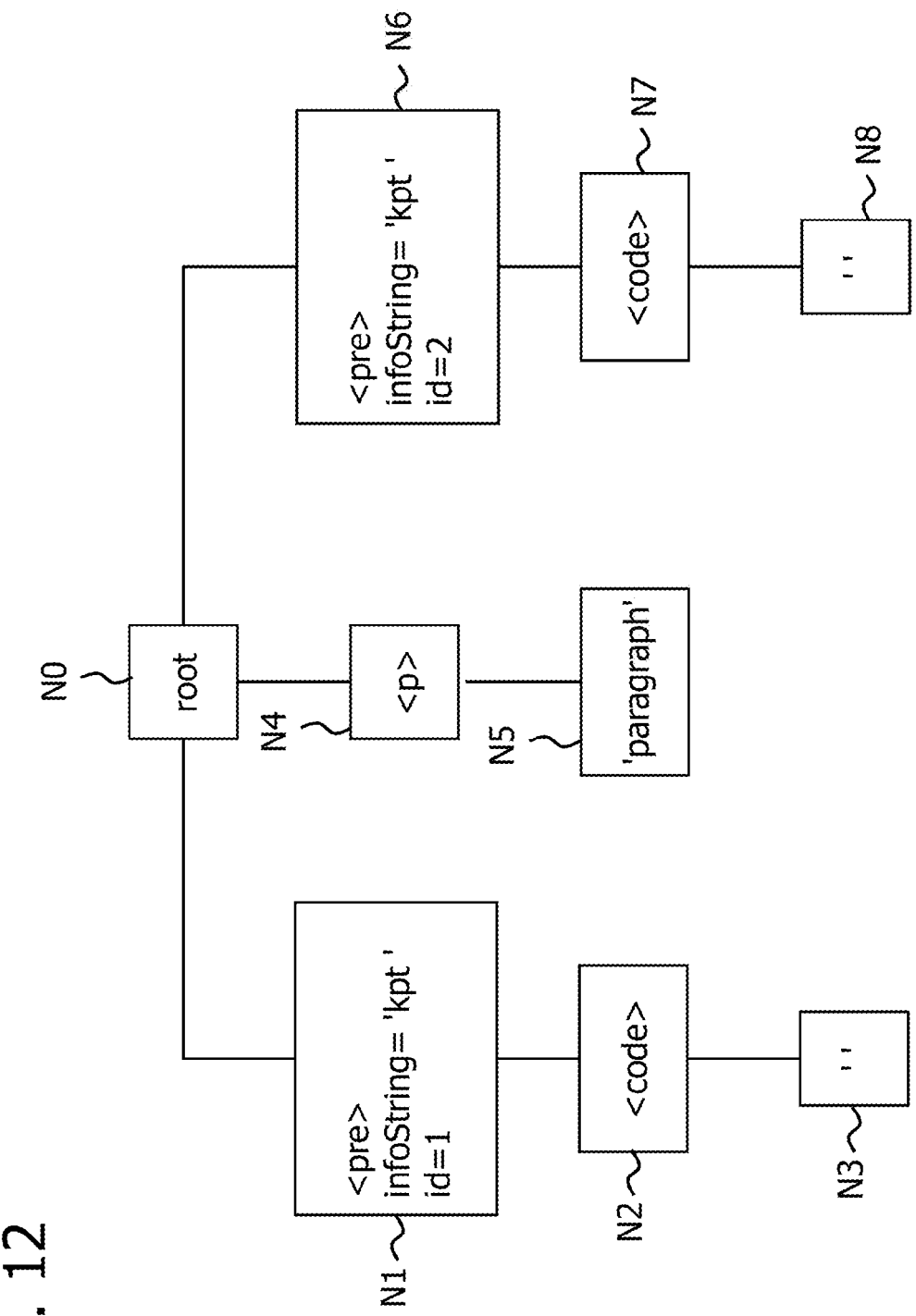
FIG. 12 depicts an example of AST.

FIG. 12 depicts an example of AST. FIG. 12 illustrates the AST generated when text analysis is executed on the text 241 depicted in FIG. 11.

Each quadrangle (a total of nine quadrangles) depicted in FIG. 12 is called a node. A root node N0 has two <pre> nodes N1, N6 and one <p> node N4.

The <pre> nodes N1, N6 have the variable info string and the variable id as attributes. In the variable info string of the <pre> nodes N1, N6, the character string "kpt" described as the info string is substituted immediately after the initial "` ` `" in the text 241. In the variable id of the <pre> node N1, 1 is substituted as identification information for identifying a plurality of instances. Meanwhile, in the variable id of the <pre> node N6, 2 is substituted as identification information for identifying a plurality of instances.

The <pre> nodes N1, N6 have, as subordinates thereof, <code> nodes N2, N7 associated with the <pre> nodes N1, N6, and text nodes N3, N8 associated with the <code> nodes N2, N7. The text nodes N3, N8 have character strings inserted between "" and "". The character string to be inserted between "" and "" in the text node N3 is a text (here, an empty character string) surrounded by the initial "` ` `" (first line) and the very last "` ` `" (second line) in the text 241. Meanwhile, the character string to be inserted between "" and "" in the text node N8 is a text (here, an empty character string) surrounded by the initial "` ` `" (sixth line) and the very last "` ` `" (seventh line) in the text 241.

The <p> node N4 has a text node N5 associated with the <p> node N4. The text nodes N3, N8 have a character string inserted between "" and "". The character string inserted between "" and "" is "paragraph" in the fourth line of the text 241.

Returning to FIG. 8, the processor 20 of the terminal 11 executes the Parser program 232b to generate an insertion position (insertion position information) representing a position (insertion position for the text 241) to which the application data to be transmitted by the first instance 233a in S104 as will be described hereinbelow will be inserted and to store the generated insertion position information in the position information table 243 (S84).

The position to which the application data are to be inserted is the position of the initial character in the line (for example, the second line) next to the initial "` ` `" (for example, the first line), and the position of the last character in a line (for example, the first line) immediately preceding the very last "` ` `" in the text 241. However, where the line next to the initial "` ` `" starts with the very last "` ` `", the position is that of the initial empty character string of the very last "` ` `".

FIG. 13 is an example of the position information table 243. FIG. 13 depicts the position information table 243 generated when text analysis is performed on the text 241 depicted in FIG. 11. In the position information table 243, an ID which is identification information for identifying a plurality of instances and an insertion position are stored in association with each other.

In the example depicted in FIGS. 13, 1 and 2 are stored as identification information for identifying the two instances in the ID, an insertion position (2, 0)-(2, 0) representing a position to which the application data to be transmitted by the first instance is to be inserted is stored in association with ID "1" in the insertion portion, and an insertion position (7, 0)-(7, 0) representing a position to which the application data to be transmitted by the second instance is to be inserted is stored in association with ID "2" in the insertion portion.

Among the insertion positions (2, 0)-(2, 0), the very first (2, 0) is a position which is in the second row and zeroth from the left, that is, a position of the initial empty character string in the second row, in the text 241 depicted in FIG. 11. The very last (2, 0) is a position which is in the second row and zeroth from the left, that is, a position of the initial empty character string of the very last "` ` `", in the text 241 depicted in FIG. 11. When the text node N3 thus has an empty character string, the very first insertion position (2, 0) and the very last insertion position (2, 0) coincide. The same is true for the insertion position (7, 0)-(7, 0).

Returning to FIG. 8, the processor 20 of the terminal 11 executes the Parser program 232b to transmit the AST (the root node N0 and the nodes N1 to N8 (including the attributes thereof) subordinate thereto) generated in S83 along with the render message to the Previewer program 232c (S85).

The processor 20 of the terminal executes the Previewer program 232c, and when receiving the AST together with the render message, transmits a renderC message and a renderP message with reference to the application correspondence table 244.

For example, when the AST includes the <pre> node N1 and kpt which is the attribute info string of the <pre> node N1 is included in the application correspondence table 244, the processor 20 of the terminal 11 executes the Previewer program 232c to transmit the <pre> node N1 (including the attribute) and the nodes N2, N3 which are subordinate thereto together with the first renderC message to the Broker program 232e (S86).

Further, when the AST includes the <pre> node N6 and the kpt which is the attribute info string of the <pre> node N6 is included in the application correspondence table 244, the processor 20 of the terminal 11 executes the Previewer program 232c to transmit the <pre> node N6 (including the attribute) and the nodes N7, N8 which are subordinate thereto together with the second renderC message to the Broker program 232e (S93).

Further, when the AST includes the <p> node N4 and the <p> node N4 does not include an attribute info string (or the attribute info string of the <p> node N4 is not included in the application correspondence table 244), the processor 20 of the terminal 11 executes the Previewer program 232c to transmit the <p> node N4 (including the attribute) and the node N5 which is subordinate thereto together with the renderP message to the Renderer program 232d (S91).

The processor 20 of the terminal 11 executes the Broker program 232e, and when receiving the <pre> node N1 (including the attribute) and the nodes N2, N3 which are subordinate thereto together with the first renderC message, the following processing is executed. That is, the constructor function associated with the kpt which is the attribute info string of the <pre> node N1 is examined with reference to the application correspondence table 244 and this constructor function (here, the constructor function of the kpt application program) is executed to start the kpt application program. As a result, the first instance 233a of the kpt application program 233 is generated (S87).

FIG. 17 illustrates an example of the application correspondence table 244. In the application correspondence table 244, the info string and the application program (constructor function) are stored in association with each other.

In the example depicted in FIG. 17, 'kpt' and 'map' are stored in the info string, the constructor function of the kpt application is stored in association with the 'kpt', and the constructor function of the map application is stored in association with the 'map'.

Returning to FIG. 8, the processor 20 of the terminal executes the Broker program 232e to transmit the renderA message, the variable data to which the character string (in this case, the empty character string) of the text node N3 subordinate to the <pre> node N1 has been substituted, the onEdit function which is a call back function, and the variable id (in this case, 1 is substituted) which is the attribute of the <pre> node N1 to the first instance 233a generated in S87 (S88).

The processor 20 of the terminal 11 executes the first instance 233a, and when receiving the variable data, the onEdit function and the variable id together with the renderA message, they are stored in the storage 24 (S89). As depicted in FIG. 3, the variable data are stored as application data 247a, the onEdit function is stored as an onEdit function 245a, and the variable id is stored as ID 246a.

The processor 20 of the terminal 11 executes the first instance 233a to generate an application image and display the generated image on the preview screen 152 (S90). FIG. 11 illustrates an example of the application image AG1 (table of Keep-Problem-Try (KPT)) displayed on the preview screen 152.

The processor 20 of the terminal 11 executes the Renderer program 232d, and when receiving the <p> node N4 (including the attribute) and the node N5 subordinate thereto together with the renderP message, generates an editor image on the basis of the <p> node N4 (including the attribute) and the node N5 subordinate thereto and displays the generated image on the preview screen 152 (S92). FIG. 11 illustrates an example of the editor image EG displayed on the preview screen 152.

Advancing to FIG. 9, the processor 20 of the terminal 11 executes the Broker program 232e, and when receiving the <pre> node N6 (including the attribute) and the nodes N7, N8 subordinate thereto together with the second renderC message, the following processing is executed. That is, the constructor function associated with the kpt which is the attribute info string of the <pre> node N6 is examined with reference to the application correspondence table 244, and the constructor function (here, the constructor function of the kpt application program) is executed to start the kpt application program 233. As a result, a second instance 233b of the kpt application program 233 is generated (S94).

The processor 20 of the terminal 11 executes the Broker program 232e to transmit variable data into which a character string (here, an empty character string) of the text node N8 subordinate to the <pre> node N6 has been substituted, the onEdit function which is a call back function, and the variable id (in this case, 2 is substituted) which is an attribute of the <pre> node N6 together with a renderA message to the second instance 233b generated in S94 (S95).

The processor 20 of the terminal executes the second instance 233b, and when receiving the variable data, the onEdit function, and the variable id together with the renderA message, they are stored in the storage 24 (S96). As depicted in FIG. 3, the variable data are stored as application data 247b, the onEdit function is stored as an onEdit function 245b, and the variable id is stored as ID 246b.

The processor 20 of the terminal 11 executes the second instance 233b to generate an application image and displays the application image on the preview screen 152 (S97). FIG. 11 illustrates an example of the application image AG2 (Keep-Problem-Try (KPT) table) displayed on the preview screen 152.

Next, a process implemented when a user operation for changing the application image AG1 is performed will be described. The same process is implemented when a user operation for changing the application image AG2 is performed, but here, a process implemented when a user operation for changing the application image AG1 will be described as a representative example.

The user operation for changing the application image AG1 is, for example, an operation by which the user inputs, via the input device 14, "Keep1" in the input field AG1a in a Keep table which is the application image AG1 displayed on the preview screen 152 and pushes an Add button AG1b.

Advancing to FIG. 10, when the user operation for changing the application image AG1 (S100) is performed, the processor 20 of the terminal 11 executes the first instance 233a to generate application data (S101), changes (overwrites) the application data 247a stored in the storage 24 with the generated application data (S102), and displays the application image on the preview screen 152 on the basis of the changed application data 247a (S103).

Specifically, the processor 20 of the terminal 11 executes the first instance 233a to generate application data, stores (overwrites) the generated application data on the application data 247a stored in the storage 24, and displays the application image on the editor screen 151 on the basis of the application data 247a stored in the storage 24.

Figure 14:
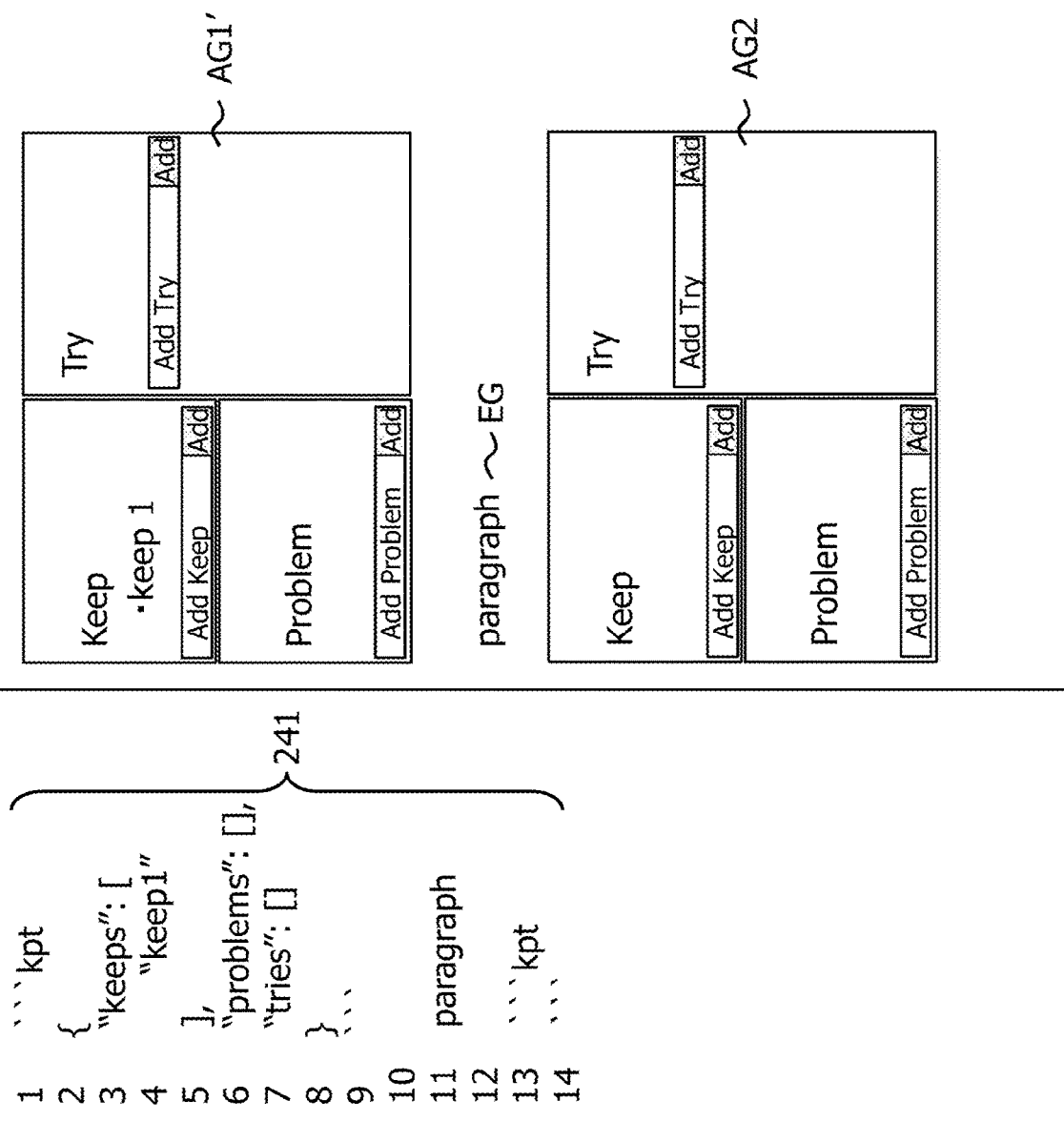
FIG. 14 illustrates another example of the editor screen 151 and the preview screen 152.

FIG. 14 illustrates another example of the editor screen 151 and the preview screen 152. FIG. 14 illustrates an example of the application data 247a changed in S102 and an example of an application image AG1' displayed on the preview screen 152 on the basis of the application data 247a changed in S102. In the application image AG1', "Keep1" is additionally displayed with respect to the application image AG1 shown in FIG. 11.

Figure 15:
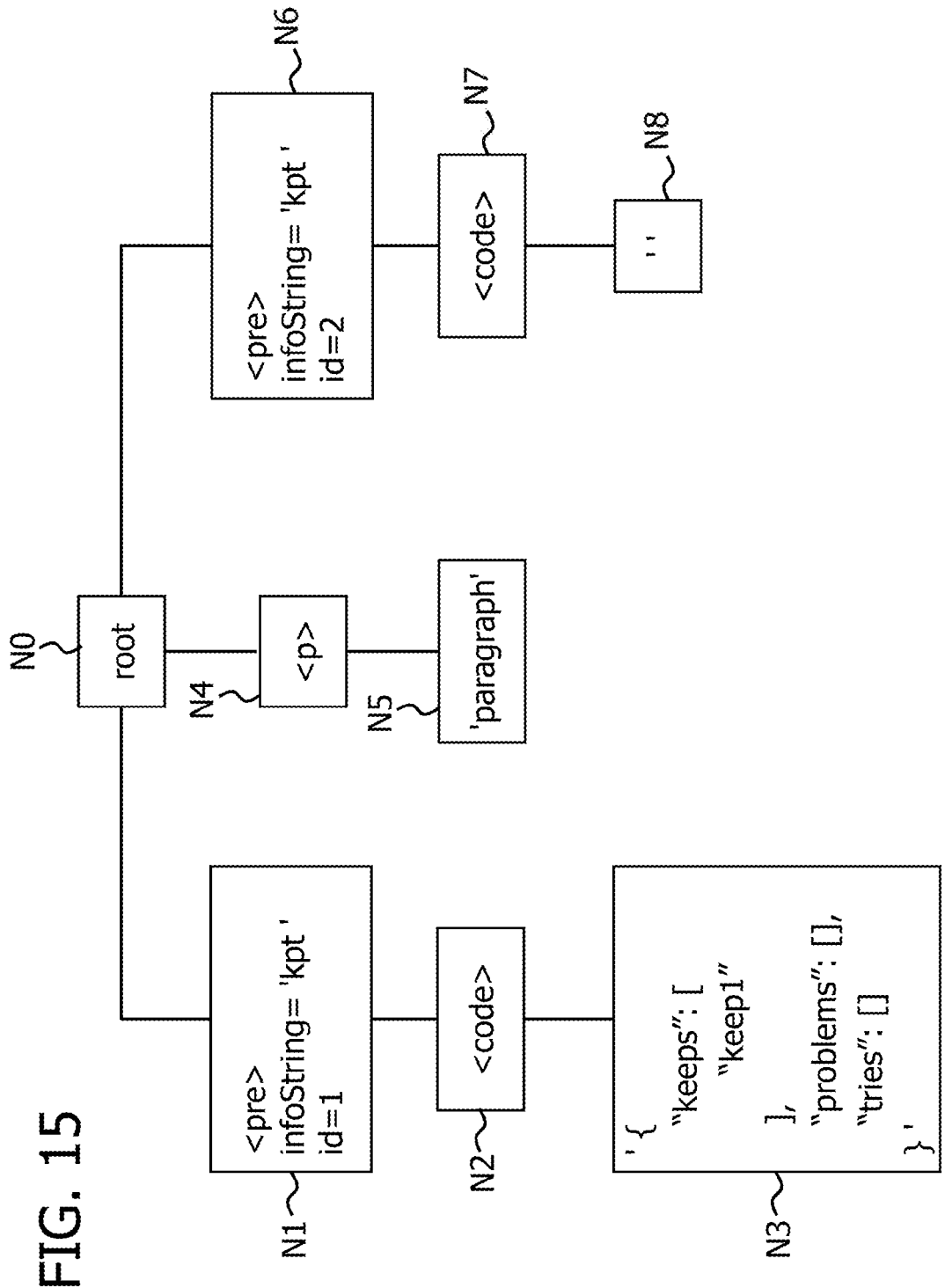
FIG. 15 illustrates another example of the AST.

FIG. 15 illustrates another example of the AST. FIG. 15 depicts the AST generated when text analysis is performed on the text 241 depicted in FIG. 14.

FIG. 16 illustrates another example of the position information table 243. FIG. 16 depicts the position information table 243 generated when text analysis is executed on the text 241 shown in FIG. 14.

Then, the processor 20 of the terminal 11 executes the first instance 233a, takes the variable id into which the ID 246a stored in S96 has been substituted and the variable newText into which the application data 247a changed in S102 have been substituted as parameters, executes the onEdit function 245a stored in storage 24 in S96, thereby transmitting the variable id (ID 246a) and the variable newText (application data 247a changed in S102) to the Parser program 232b (S104).

The processor 20 of the terminal 11 executes the Parser program 232b, and when receiving the ID 246a and the application data 247a (S105), examines the insertion position associated with the received ID 246a (here, 1 is substituted) with reference to the position information table 243 (FIG. 13), and inserts (overwrites) the received application data 247a at the position indicated by the insertion position in the text temporarily stored in step S83 (S106).

The processor 20 of the terminal 11 executes the Parser program 232b to transmit the text into which the application data 247a have been inserted to the Editor program 232a (S107).

The processor 20 of the terminal 11 executes the Editor program 232a, and when receiving the text into which the application data 247a have been inserted, changes the editor screen 151 on the basis of the received text (S108). Specifically, the processor 20 of the terminal 11 executes the Editor program 232a to change (overwrite) the text 241 stored in the storage 24 with the received text and to display the changed text 241 on the editor screen 151 on the basis of the text 241 stored in the storage 24. FIG. 14 illustrates an example in which the changed text 241 is displayed on the editor screen 151.

Next, the processor 20 of the terminal 11 executes the Editor program 232a, reads the text 241 (text into which the application data 247a have been inserted in S106) from the storage 24 and transmits the text to the Parser program 232b (S109). Subsequently, the process of S83 to S97 is executed (not depicted in the figures).

As a result, the position information table 243 depicted in FIG. 13 is updated as depicted in FIG. 16.

The very first insertion position (2, 1) among the insertion positions (2, 1)-(8, 2) depicted in FIG. 16 represents the position of the very first character in the line (second line) next to the very first "``` ``` ```" (first line) in the text 241 depicted in FIG. 14. The very last insertion position (8, 2) represents the position of the very last character of a line (eighth line) immediately preceding the very last "``` ``` ```" (ninth line).

Next, an example of other text 241 input by the user via the input device 14, examples of the editor image and the application image, an example of the AST, and an example of the position information table when the text 241 is input will be explained in a simple manner with reference to FIGS. 18 to 23.

Figure 18:
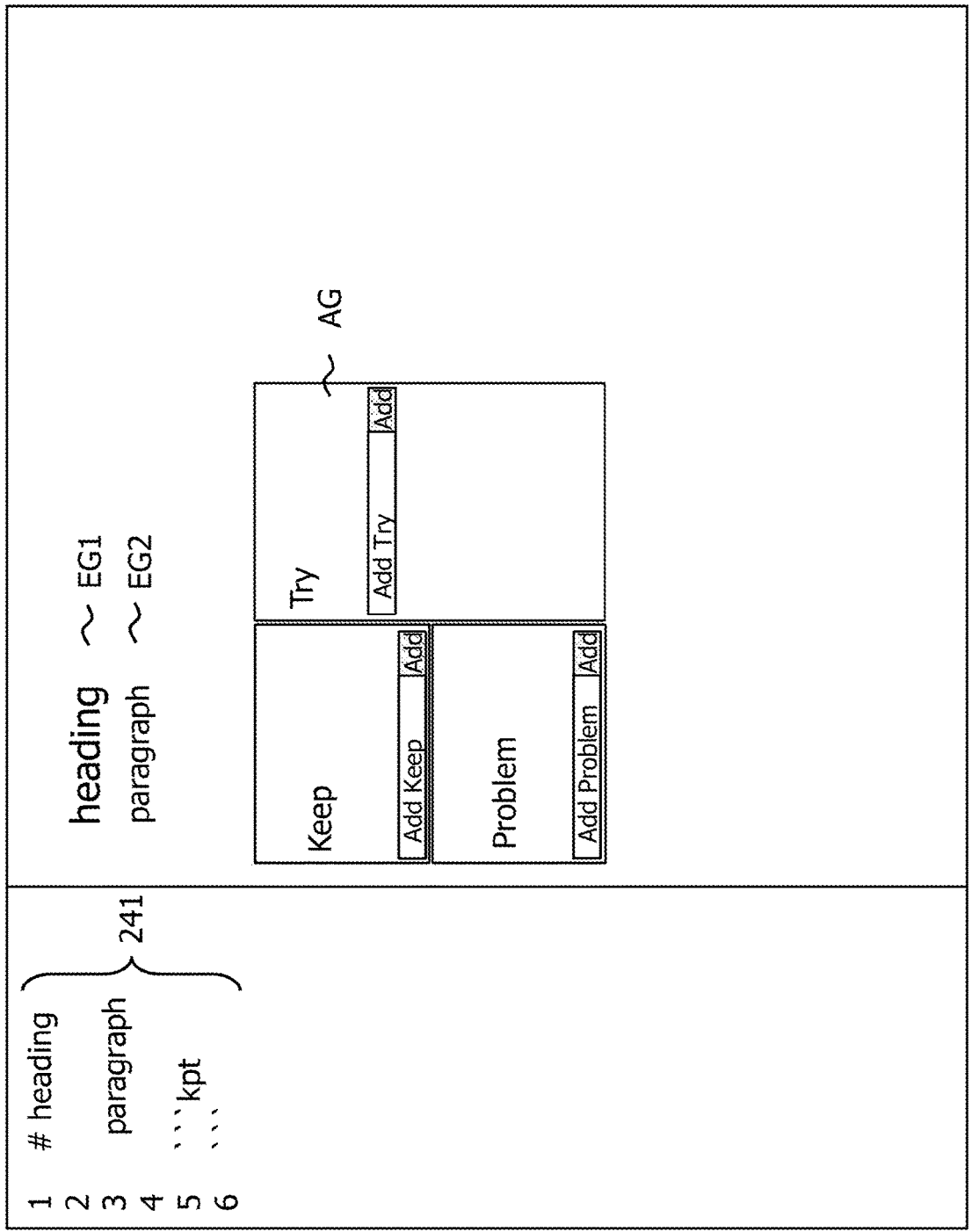
FIG. 18 illustrates another example of the editor screen 151 and the preview screen 152.

FIG. 18 illustrates another example of the editor screen 151 and the preview screen 152. FIG. 18 depicts editor images EG1, EG2 and an application image AG displayed on the preview screen 152 by the user inputting the text 241 depicted in FIG. 18 via the input device 14. The editor images EG1 and EG2 and the application image AG are displayed by executing the process of S80 to S97.

Figure 19:
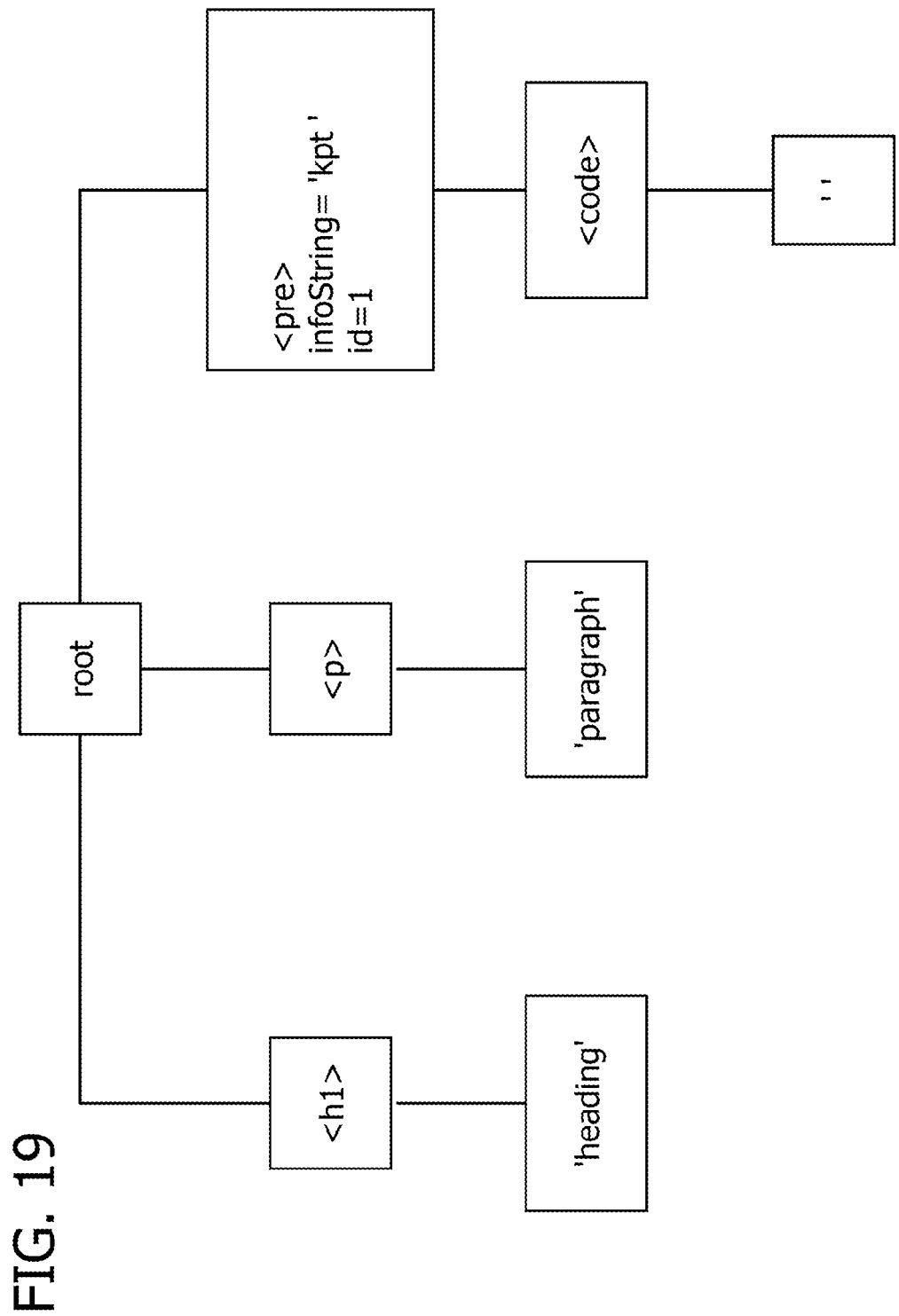
FIG. 19 illustrates another example of the AST.

FIG. 19 illustrates another example of the AST. FIG. 19 depicts the AST generated when text analysis is executed on the text 241 depicted in FIG. 18.

FIG. 20 illustrates another example of the position information table 243. FIG. 20 depicts the position information table 243 generated when text analysis is executed on the text 241 depicted in FIG. 19.

Figure 21:
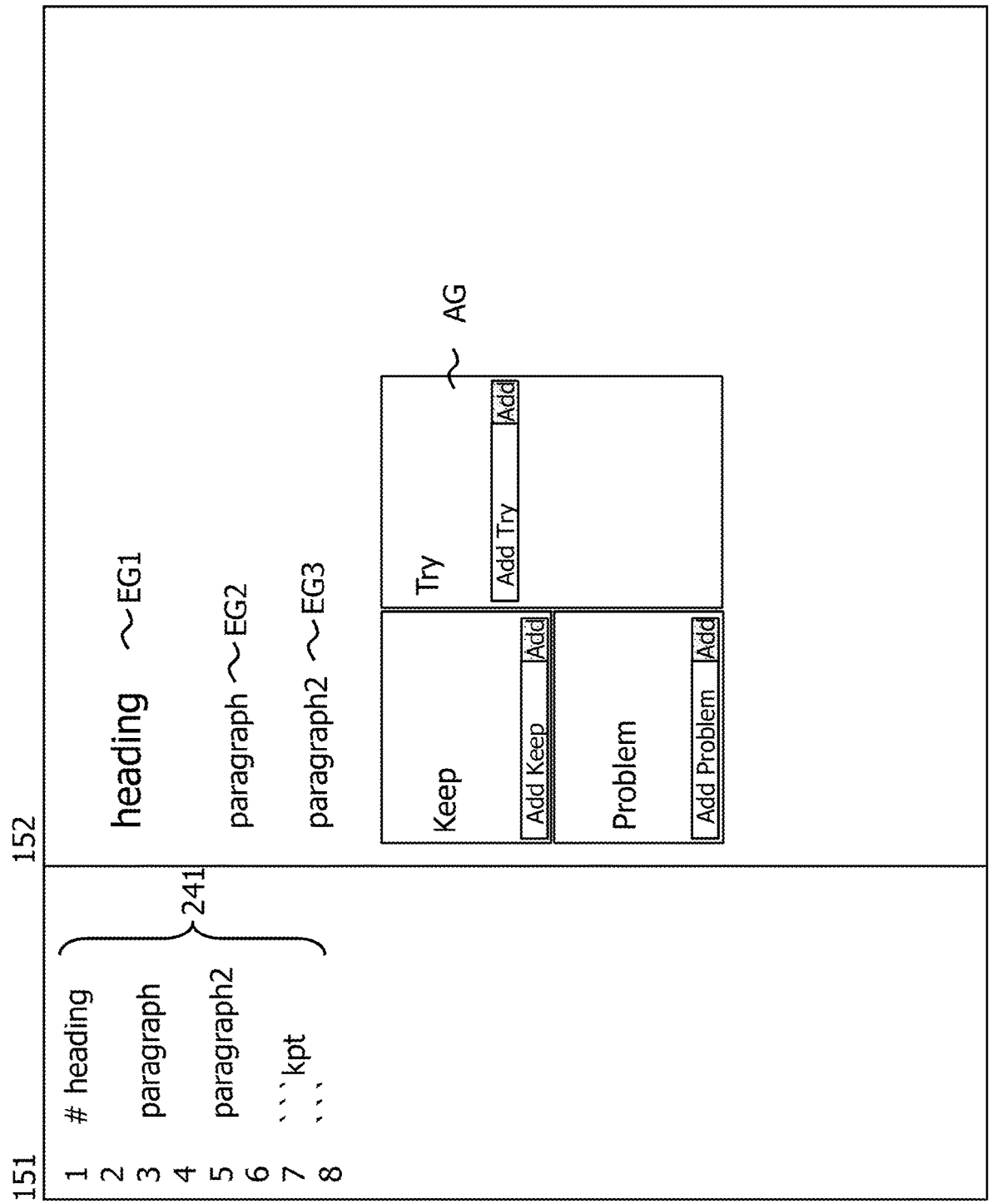
FIG. 21 illustrates another example of the editor screen 151 and the preview screen 152.

FIG. 21 illustrates another example of the editor screen 151 and the preview screen 152. FIG. 21 depicts the editor images EG 1, EG 2, EG 3 and the application image AG displayed on the preview screen 152 by the user additionally inputting the fifth and sixth lines depicted in FIG. 21 to the text 241 depicted in FIG. 21 via the input device 14. The editor images EG 1, EG 2, EG 3 and the application image AG are displayed by executing the process of S80 to S97.

Figure 22:
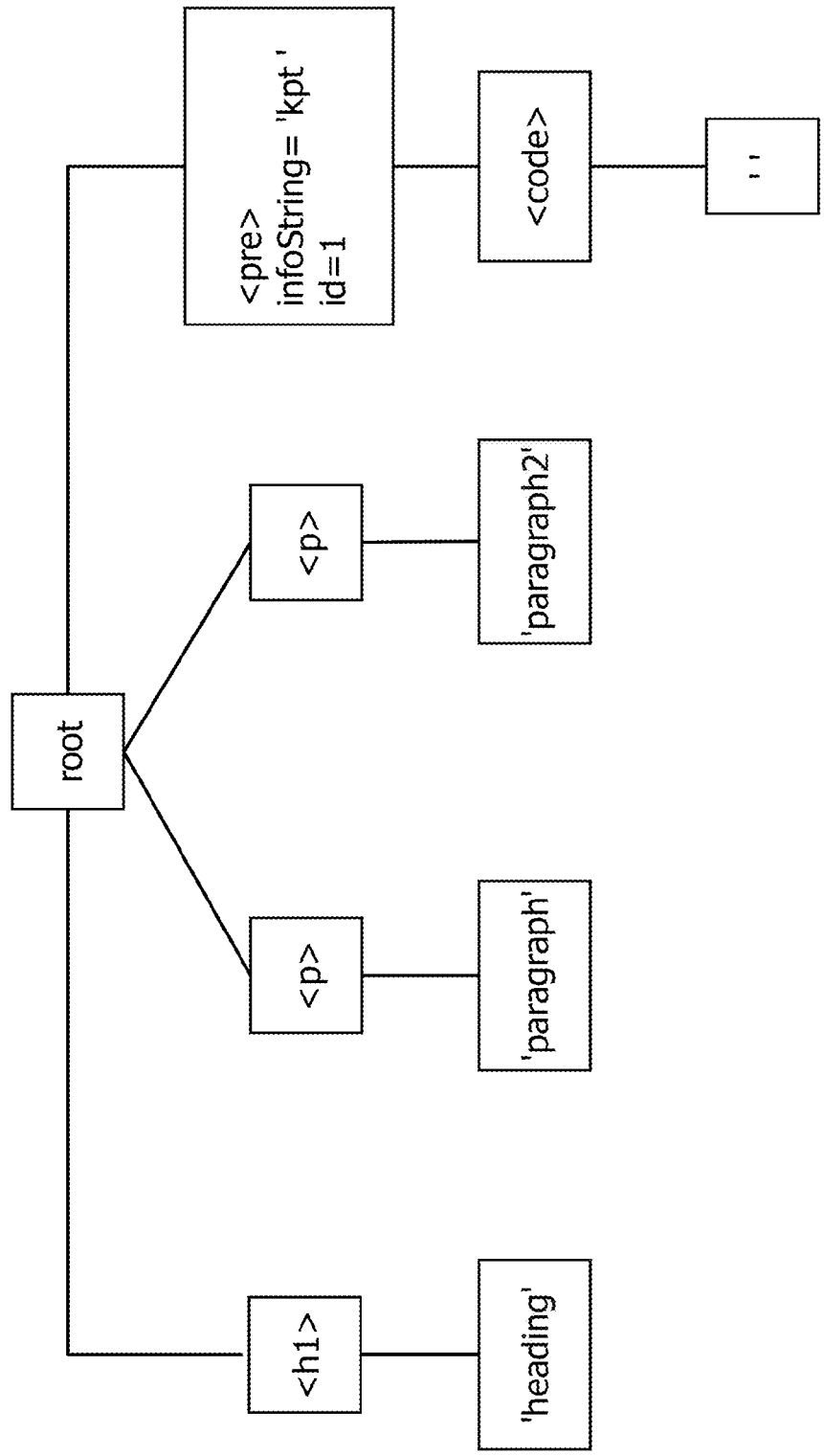
FIG. 22 illustrates another example of the AST.

FIG. 22 illustrates another example of the AST. FIG. 22 depicts the AST generated when text analysis is executed on the text 241 depicted in FIG. 21.

FIG. 23 illustrates another example of the position information table 243. FIG. 23 depicts the position information table 243 generated when text analysis is executed on the text 241 depicted in FIG. 21.

As described above, according to the first embodiment, the user can edit the text 241 and change the editor image EG on the preview screen 152 by inputting the text via the input device 14 (or the text received from the server 13). Further, when a user operation for changing the application image is performed, the application data are changed, and the changed application data are inserted at an appropriate position indicated by the insertion position (insertion position information) in the text 241. That is, the text 241 can be edited even when a user operation for changing the application image is performed.

Thus, according to the first embodiment, it is possible to edit (change) the text 241 from both directions.

Second Embodiment

In the second embodiment, in order to reflect the editing contents for the text at one terminal in the text at the other terminal, as depicted in FIG. 3, a server 13 is provided that transfers the text input at a certain terminal (or a difference between before and after editing) to another terminal between a plurality of terminals 11, 12.

Figure 24:
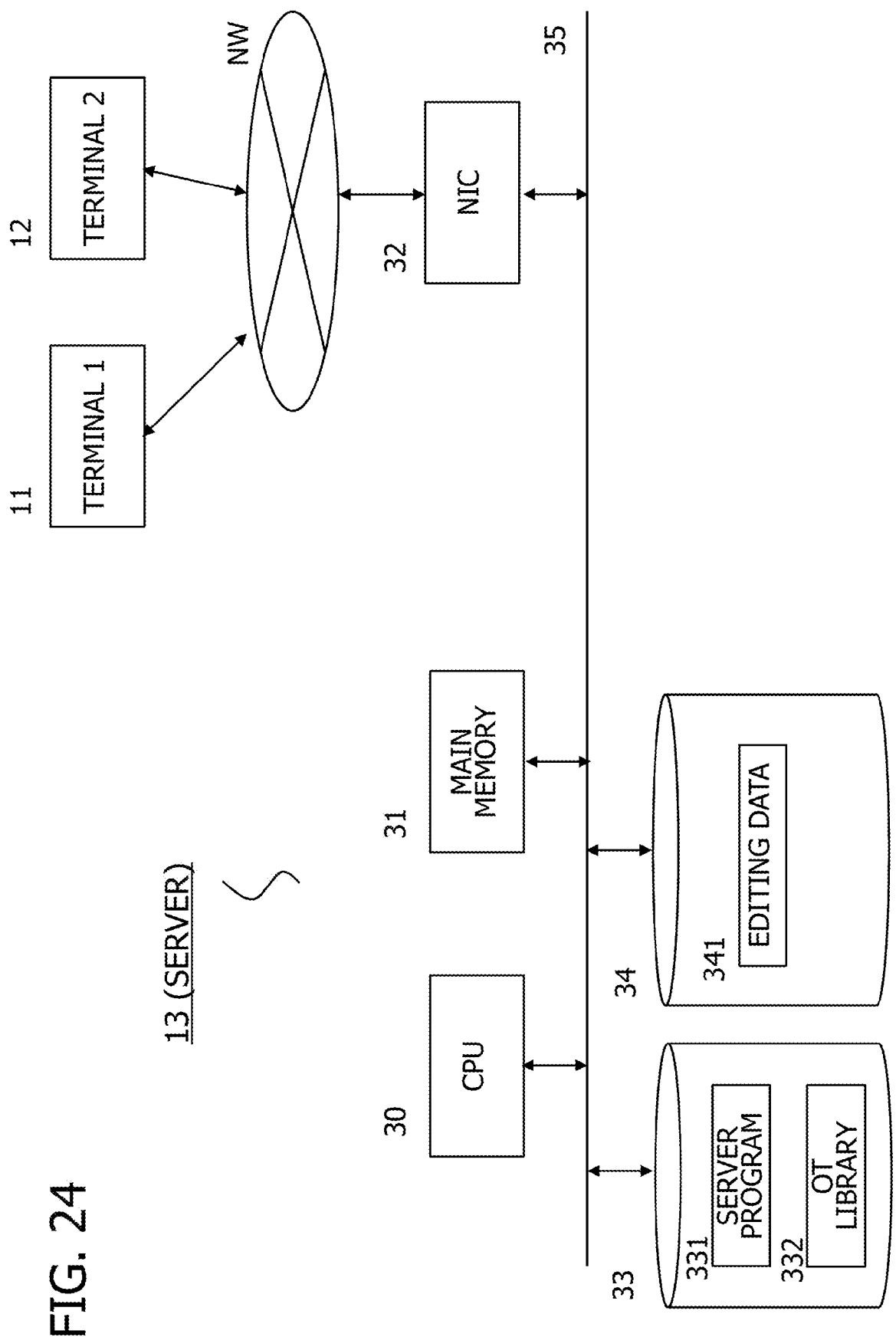
FIG. 24 is a diagram illustrating a configuration example of the server 13.

FIG. 24 is a diagram illustrating a configuration example of the server 13. As depicted in FIG. 24, the server 13 has a CPU 30 (hereinafter also referred to as a processor 30), a main memory 31, an NIC 32 (a network interface card), storages 33, 34, and a bus 35. An OS (not depicted in the figure), a server program 331, and an OT library 332 are stored in the storage 33, and these programs are developed in the main memory 31 and executed by the CPU 30. In the storage 34, editing data 341 are stored.

Figure 25:
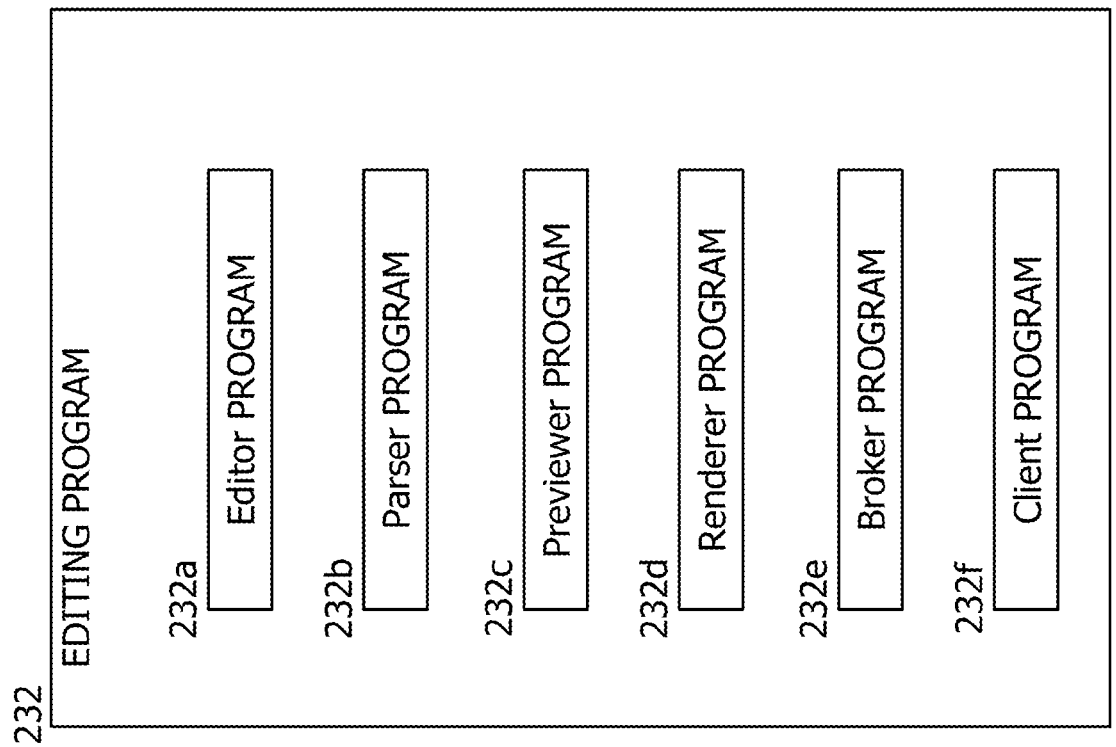
FIG. 25 is a diagram illustrating a group of programs constituting the editing program 232 of the second embodiment.

FIG. 25 is a diagram illustrating a group of programs constituting the editing program 232 of the second embodiment. As depicted in FIG. 25, in the editing program 232 of the second embodiment, a Client program 232f is added to the editing program 232 of the first embodiment. The Client program 232f is described by, for example, JavaScript.

Outline of Process of Editor Program 232a

Figure 26:
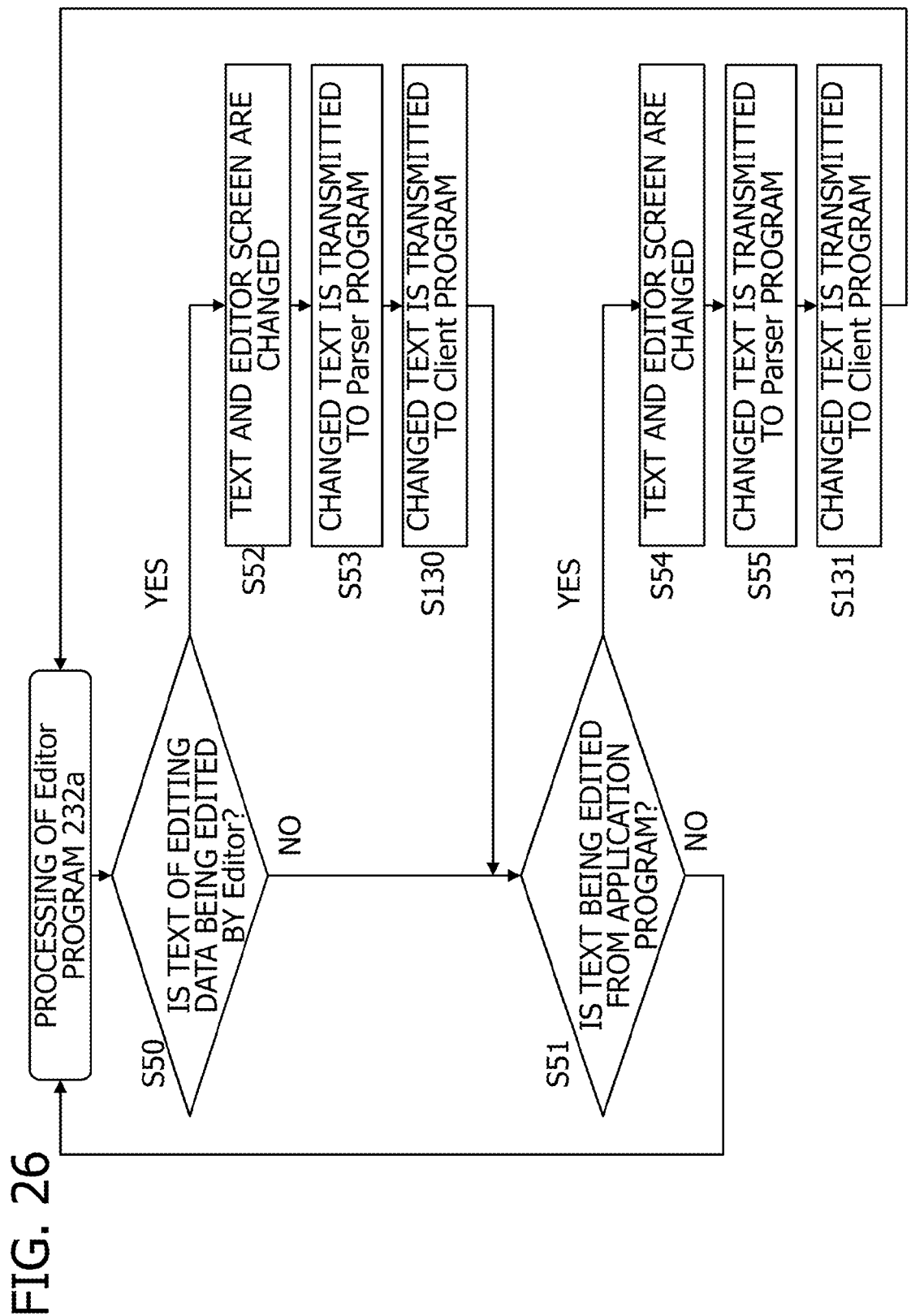
FIG. 26 is a flowchart for explaining the outline of the process of the Editor program 232a of the second embodiment.

FIG. 26 is a flowchart for explaining the outline of the process of the Editor program 232a of the second embodiment. In the flowchart depicted in FIG. 26, the process of S130 to S131 is added to the flowchart depicted in FIG. 5.

The processor 20 of the terminal 11 executes the Editor program 232a, and when determining that the user has edited the text via the input device 14 (S50: YES), changes the text 241 displayed on the editor screen 151 and changes the editor image EG displayed on the preview screen 152 (S52), and transmits the changed text to the Parser program 232b (S53). The changed text is also transmitted to the Client program 232f (S130).

The processor 20 of the terminal 11 executes the Editor program 232a, and when determining that the text has been edited from the application program 233 (S51: YES), the processor 20 of the terminal 11 executes the Editor program 232a to change the text 241 displayed on the editor screen 151 and the editor image EG displayed on the preview screen 152 (S54) and transmits the changed text to the Parser program 232b (S55). The changed text is also transmitted to the Client program 232f (S131).

Figure 27:
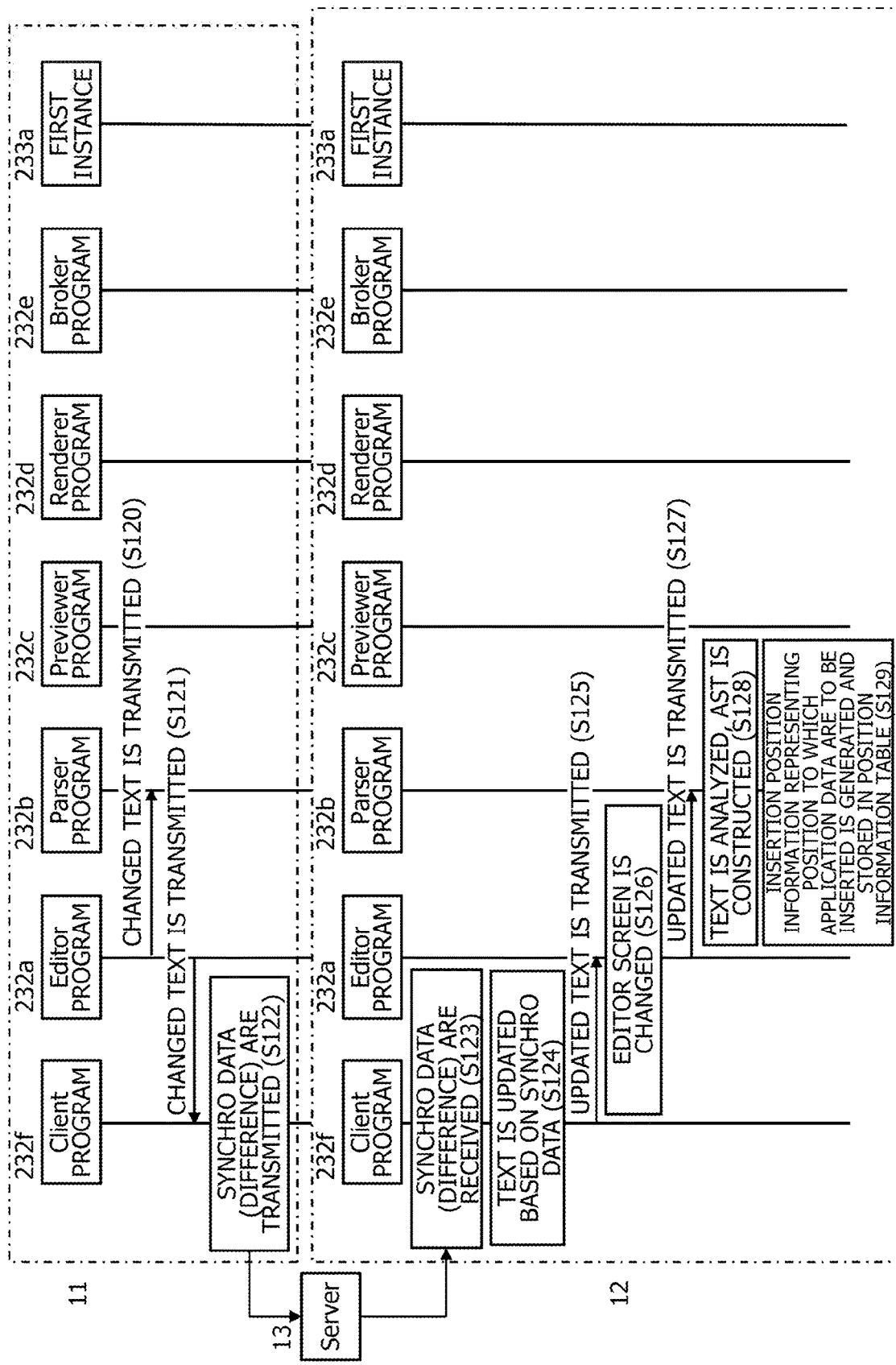
FIG. 27 is a sequence diagram for explaining the process of reflecting (synchronizing) the editing contents for the text at the terminal 11 in the text at the terminal 12.

FIG. 27 is a sequence diagram for explaining the process of reflecting (synchronizing) the editing contents for the text at the terminal 11 in the text at the terminal 12.

In the following description, it is assumed that the processors 20 of the terminals 11, 12 execute each program constituting the editing program 232, that is, the Editor program 232a, the Parser program 232b, the Previewer program 232c, the Renderer program 232d, the Broker program 232e, and the Client program 232f.

Further, in the following description, it is assumed that the application program 233 is a kpt application program which creates a table of Keep-Problem-Try (KPT) as an application image and displays the table on the preview screen 152.

First, when the user edits the text (changes the text 241 stored in the storage 24, or inputs new text, or the like) via the input device 14 of the terminal 11, the processor 20 of the terminal 11 executes the Editor program 232a to change the editor screen 151, reads the text 241 from the storage 24 at a predetermined timing (for example, every time one character of the text is input), and transmits the read text to the Parser program 232b (S120) in the same manner as in the first embodiment. Thereafter, the process of S83 to S97 is executed in the terminal 11 in the same manner as in the first embodiment.

At the same time, the processor 20 of the terminal 11 executes the Editor program 232a to transmit the text 241 read from the storage 24 to the Client program 232f (S121).

The processor 20 of the terminal 11 executes the Client program 232f, and when receiving the text 241, executes the process of calling out a predetermined function from the OT library 234 (a group of functions described in JavaScript) to calculate a difference between the previously received text 241 and currently received text 241, and transmits the difference as synchro data to the server 13 (S122).

Figure 28:
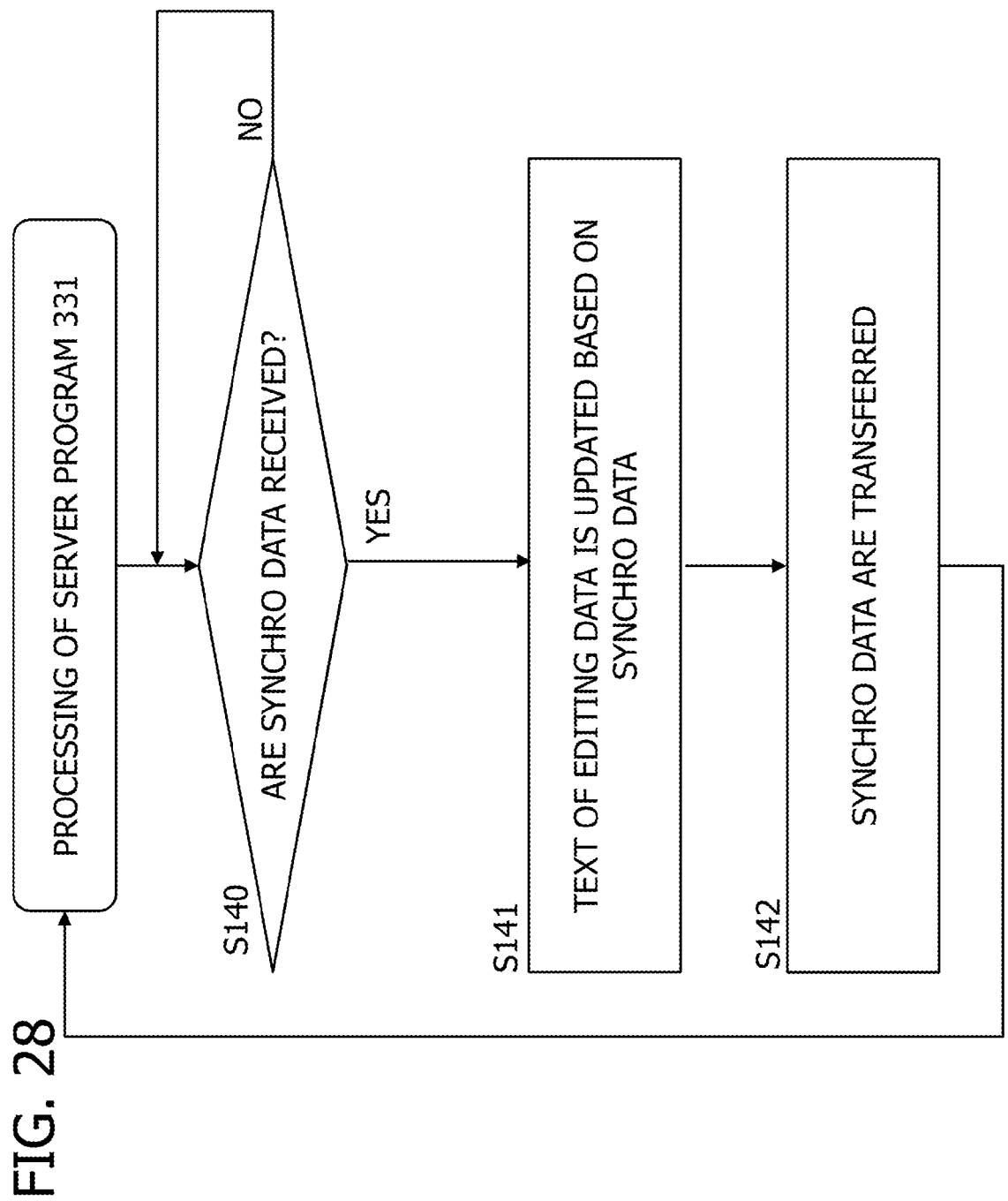
FIG. 28 is a flowchart for explaining the process of the server program 331.

FIG. 28 is a flowchart for explaining the process of the server program 331. As depicted in FIG. 28, the processor 30 of the server 13 executes the server program 331 to determine whether or not the synchro data transmitted from the terminal 11 have been received (S140), and when determining that the synchro data have been received (S140: YES), calls out a predetermined function from the OT library 332 (group of functions described in JavaScript) and updates the text of the editing data 341 on the basis of the received synchro data (S141). As a result, the identity between the editing data 341 of the server 13 and the editing data 241 of the terminal 11 is maintained. The server 13 transmits the editing data 341 to the terminal that has newly accessed the server 13.

Then, the processor 30 of the server 13 executes the server program 331 to transfer the received synchro data to the terminal 12 (Client program 232f) (S142). The address of the transfer destination terminal 12 is registered in advance in the server 13.

Returning to FIG. 27, the processor 20 of the terminal 12 executes the Client program 232f, and when receiving the synchro data (S123), updates the text on the basis of the synchro data (S124).

The processor 20 of the terminal 12 executes the Client program 232f to transmit the updated text to the Editor program 232a (S125).

The processor 20 of the terminal 12 executes the Editor program 232a, and when receiving the updated text, changes the editor screen on the basis of the received text (S126). Specifically, the processor 20 of the terminal 12 executes the Editor program 232a to change (overwrite) the text 241 stored in the storage 24 with the received text and also displays the changed text 241 on the editor screen 151 on the basis of the text 241 stored in the storage 24. As a result, the identity between the editing data 241 of the terminal 11 and the editing data 241 of the terminal 12 is maintained.

The processor 20 of the terminal 12 executes the Editor program 232a to read the text 241 from the storage 24 and transmits the read text to the Parser program 232b (S127).

Thereafter, the process of S83 to S97 is executed in the terminal 12 in the same manner as in the first embodiment.

As described above, according to the second embodiment, by synchronizing the text 241 between the plurality of terminals 11, 12 by using, for example, a known OT, it is possible to reflect the editing contents for the text at one terminal 11 in the text at the other terminal 12 without providing the application program 233 with a synchronization function.

Generally, only a text can be shared among a plurality of terminals 11, 12, but according to the second embodiment, by merely sharing (synchronizing) a text among a plurality of terminals 11, 12, it is possible to share the same application image together with the same editor image (display at each terminal).

For example, while a plurality of users uses a plurality of terminals 11, 12 to display and edit the same record of proceedings (text) on a plurality of terminals 11, 12, it is possible to start the kpt application program 233 at the plurality of terminals 11, 12, to display the same application image (for example, a table of Keep-Problem-Try (KPT)) at each of the terminals 11, 12, and perform KPT (review) with a plurality of people.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein an editing program for causing a computer to execute a process comprising:
    when editing data having a text have been changed, displaying a text of the changed editing data on an editor screen, and displaying an editor image generated based on the changed editing data on a preview screen;
    when a command to start an application program has been input in the text of the editing data, starting the application program, and displaying an application image generated by the application program together with the editor image on the preview screen;
    when a user operation for changing the application image is performed, receiving first application data which is changed based on the user operation for changing the application image by the application program, and insertion position information on the first application data in the text of the editing data, the application program changing the application image based on the first application data;
    inserting the first application data to an insertion position represented by the insertion position information in the text of the editing data in response to the receiving, and displaying in the editor screen the text of the editing data in which the first application data is inserted; and
    when the first application data inserted in the editing data have been changed to a second application data, causing the application program to overwrite the second application data on the first application data, and transmitting a message to change the application image on the basis of the second application data together with the second application data to the application program.

2. The non-transitory computer-readable storage medium according to claim 1, wherein the application data inserted in the editing data are application data input by the user via an input device or application data received from a server.

3. The non-transitory computer-readable storage medium according to claim 1, wherein the text is a text written in a markup language.

4. A non-transitory computer-readable storage medium storing therein an editing program for causing a computer to execute a process comprising:
when editing data having a text have been changed, displaying a text of the changed editing data on an editor screen, and displaying an editor image generated based on the changed editing data on a preview screen;
when a command to start an application program has been input in the text of the editing data, starting the application program, and displaying an application image generated by the application program together with the editor image on the preview screen;
when a user operation for changing the application image is performed, receiving first application data changed by the application program together with the application image, and insertion position information on the first application data in the text of the editing data;
inserting the first application data to an insertion position represented by the insertion position information in the text of the editing data in response to the receiving; and
when the first application data inserted in the editing data have been changed to a second application data, causing the application program to overwrite the second application data on the first application data, and transmitting a message to change the application image on the basis of the first application data together with the second application data to the application program; wherein
the process includes:
generating an insertion position representing a position to which the first application data are to be inserted in the text of the editing data, on the basis of a specific character string in the text of the editing data; and
updating the insertion position when the editing data are changed, and
an insertion position represented by the insertion position information is an insertion position generated by the process of generating the insertion position, or an insertion position updated by the process of updating the insertion position.

5. A non-transitory computer-readable storage medium storing therein an editing program for causing a computer to execute a process comprising:
when editing data having a text have been changed, displaying a text of the changed editing data on an editor screen, and displaying an editor image generated based on the changed editing data on a preview screen;
when a command to start an application program has been input in the text of the editing data, starting the application program, and displaying an application image generated by the application program together with the editor image on the preview screen;
when a user operation for changing the application image is performed, receiving first application data changed by the application program together with the application image, and insertion position information on the first application data in the text of the editing data;
inserting the first application data to an insertion position represented by the insertion position information in the text of the editing data in response to the receiving; and
when the first application data inserted in the editing data have been changed to a second application data, causing the application program to overwrite the second application data on the first application data, and transmitting a message to change the application image on the basis of the first application data together with the second application data to the application program; wherein
the displaying the application image together with the editor image on the preview screen includes starting the application program and generating an instance,
the position insertion information includes identification information that identifies the instance,
the process includes generating an insertion position representing a position to which the first application data are to be inserted in the text of the editing data, and storing the generated insertion position in association with the identification information that identifies the instance, and
the inserting the first application data to the insertion position includes inserting the first application data to an insertion position associated with the identification information which is the insertion position information in the text of the editing data, in response to the reception.

6. An editing device comprising:
a processor; and
a memory accessible from the processor, wherein
the processor is configured to:
when editing data having a text have been changed, display a text of the changed editing data on an editor screen, and display an editor image generated based on the changed editing data on a preview screen;
when a command to start an application program has been input in the text of the editing data, start the application program, and display an application image generated by the application program together with the editor image on the preview screen;
when a user operation for changing the application image is performed, receive first application data which is changed based on the user operation for changing the application image by the application program, and insertion position information on the first application data in the text of the editing data, the application program changing the application image based on the first application data;
insert the first application data to an insertion position represented by the insertion position information in the text of the editing data in response to the receiving, and display in the editor screen the text of the editing data in which the first application data is inserted; and
when the first application data inserted in the editing data have been changed to a second application data, cause the application program to overwrite the second application data on the first application data, and transmit a message to change the application image on the basis of the second application data together with the second application data to the application program.

7. An editing method including a process comprising:
when editing data having a text have been changed, displaying a text of the changed editing data on an editor screen, and displaying an editor image generated based on the changed editing data on a preview screen;

when a command to start an application program has been input in the text of the editing data, starting the application program, and displaying an application image generated by the application program together with the editor image on the preview screen;

when a user operation for changing the application image is performed, receiving first application data which is changed by the application program, and insertion position information on the first application data in the text of the editing data, the application program changing the application image based on the first application data;

inserting the first application data to an insertion position represented by the insertion position information in the text of the editing data in response to the receiving, and displaying in the editor screen the text of the editing data in which the first application data is inserted; and when the first application data inserted in the editing data have been changed to a second application data, causing the application program to overwrite the second application data on the first application data, and transmitting a message to change the application image on the basis of the second application data together with the second application data to the application program.

* * * * *